US012412997B2

(12) United States Patent
Li et al.

(10) Patent No.: US 12,412,997 B2
(45) Date of Patent: Sep. 9, 2025

(54) ELECTRONIC DEVICE AND ANTENNA MODULE

(71) Applicant: WISTRON NEWEB CORPORATION, Hsinchu (TW)

(72) Inventors: Kuan-Hung Li, Hsinchu (TW); Shang-Ching Tseng, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 85 days.

(21) Appl. No.: 18/588,106

(22) Filed: Feb. 27, 2024

(65) Prior Publication Data

US 2025/0158294 A1 May 15, 2025

(30) Foreign Application Priority Data

Nov. 13, 2023 (TW) ................................ 112143630

(51) Int. Cl.
*H01Q 1/28* (2006.01)
*H01Q 5/50* (2015.01)
*H01Q 21/28* (2006.01)

(52) U.S. Cl.
CPC ............... *H01Q 21/28* (2013.01); *H01Q 5/50* (2015.01)

(58) Field of Classification Search
CPC .......... H01Q 21/28; H01Q 5/50; H01Q 5/371; H01Q 1/243
See application file for complete search history.

(56) References Cited

U.S. PATENT DOCUMENTS

| | | | | |
|---|---|---|---|---|
| 10,218,055 | B2 * | 2/2019 | Tseng | H01Q 1/243 |
| 10,873,124 | B2 * | 12/2020 | Chen | H01Q 1/243 |
| 11,171,409 | B2 * | 11/2021 | Chen | H01Q 1/243 |
| 11,349,210 | B2 * | 5/2022 | Li | H01Q 13/10 |
| 11,769,939 | B2 * | 9/2023 | Chang | H01Q 9/42 343/702 |
| 2021/0359410 | A1 * | 11/2021 | Li | H01Q 1/246 |

* cited by examiner

*Primary Examiner* — Dameon E Levi
*Assistant Examiner* — Michael M Bouizza
(74) *Attorney, Agent, or Firm* — McClure, Qualey & Rodack, LLP

(57) ABSTRACT

An electronic device includes a metal cover and an antenna module. The metal cover includes two cover slots. The antenna module includes a substrate, an antenna structure, and a bottom structure. Both sides of the substrate are provided with the antenna structure and the bottom structure that are connected. A plurality of projection regions respectively defined by orthogonally projecting a first excitation segment and a second excitation segment of the antenna structure onto the metal cover are partially overlapped with the two cover slots. The first excitation segment and the second excitation segment are connected to each other. The bottom structure has two antenna slots. When a signal source is fed into the antenna structure through a feeding portion, the antenna structure, the two antenna slots, and the two cover slots can cooperate with each other to generate three frequency bands with different frequency ranges.

19 Claims, 16 Drawing Sheets

ELECTRONIC DEVICE AND ANTENNA MODULE

CROSS-REFERENCE TO RELATED PATENT APPLICATION

This application claims the benefit of priority to Taiwan Patent Application No. 112143630, filed on Nov. 13, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electronic device and an antenna module, and more particularly to an electronic device for three different frequency bands and an antenna module for three different frequency bands.

BACKGROUND OF THE DISCLOSURE

A conventional electronic device (e.g., a smartphone, a tablet computer, or a laptop computer) is provided with a plurality of antennas therein by manufacturers for wireless communication in different frequency bands. Accordingly, the conventional electronic device can be operated for wireless communication in different frequency bands through different antennas.

In practice, since the interior space in the conventional electronic device (e.g., the smartphone, the tablet computer, or the laptop computer) for installing the antennas is relatively small, manufacturers may encounter an issue where the plurality of antennas cannot all be installed in the conventional electronic device. Therefore, how a necessary number of the antennas can be installed in an electronic device having a smaller interior space has become an issue for relevant manufacturers.

SUMMARY OF THE DISCLOSURE

In response to the above-referenced technical inadequacies, the present disclosure provides an electronic device and an antenna module for improving on the issues associated with conventional electronic devices (e.g., smartphones or laptop computers). Specifically, the issues are described as follows. In order to receive wireless signals in a variety of different frequency bands, the conventional electronic device needs to be installed with a plurality of antennas. As overall appearances of smartphones, laptop computers and other devices trend toward thinner and lighter, multiple antennas capable of receiving different frequency bands are difficult to be installed into such devices in order to maintain the reception efficiency of the antennas.

In order to solve the above-mentioned problems, one of the technical aspects adopted by the present disclosure is to provide an electronic device. The electronic device includes a metal cover and an antenna module. The metal cover has two cover slots arranged side by side and penetrating therethrough, and lengths of the two cover slots are different from each other. The antenna module includes a substrate, an antenna structure, and a bottom structure. The substrate is disposed on one side of the metal cover. The substrate has a first side surface and a second side surface that is opposite to the first side surface. The antenna structure is a conductive structure and is formed on the first side surface. The antenna structure defines a feeding portion, and the antenna structure includes a first excitation segment, a second excitation segment, and a connecting segment. A projection region defined by orthogonally projecting the first excitation segment onto the metal cover is at least partially overlapped with one of the two cover slots. A projection region defined by orthogonally projecting the second excitation segment onto the metal cover is at least partially overlapped with another one of the two cover slots. The connecting segment that connects the first excitation segment and the second excitation segment. The bottom structure is electrically conductive and is disposed on the second side surface, the bottom structure is connected to the antenna structure, and the bottom structure is grounded through the substrate. The bottom structure has two antenna slots, and lengths of the two antenna slots are different from each other. When a signal source is fed into the antenna structure through the feeding portion, the antenna structure, one of the two antenna slots, and the one of the two cover slots are configured to generate a first frequency band, the antenna structure, another one of the two antenna slots, and the another one of the two cover slots are configured to generate a second frequency band, and the antenna structure is configured to generate a third frequency band. Moreover, a frequency range of the first frequency band, a frequency range of the second frequency band, and a frequency range of the third frequency band are not completely identical to each other.

In order to solve the above-mentioned problems, another one of the technical aspects adopted by the present disclosure is to provide an antenna module. The antenna module is fixed on a metal cover, the metal cover includes a metal cladding layer structure and a non-metallic inner layer structure. An outer surface of the metal cover being arranged on the metal cladding layer structure and the metal cladding layer structure envelopes the non-metal inner structure. The metal cover has two cover slots arranged side by side and penetrating therethrough, lengths of the two cover slots are different from each other, and the antenna module includes a substrate, an antenna structure, and a bottom structure. The substrate is disposed on one side of the metal cover, and the substrate has a first side surface and a second side surface that is opposite to the first side surface. The antenna structure is a conductive structure and is formed on the first side surface. The antenna structure defines a feeding portion, and the antenna structure includes a connecting segment, a first excitation segment, and a second excitation segment. The first excitation segment extends from one end of the connecting segment in an extending direction. The second excitation segment extends from another one end of the connecting segment in the extending direction. The bottom structure is conductive and is disposed on the second side surface, the bottom structure is connected to the antenna structure, the bottom structure is grounded through the substrate, the bottom structure has two antenna slots, and lengths of the two antenna slots are different from each other. When the antenna module is fixed on the metal cover, a projection region defined by orthogonally projecting the first excitation segment onto the metal cover is at least partially overlapped with one of the two cover slots, and a projection region defined by orthogonally projecting the second excitation segment onto the metal cover is at least partially overlapped with another one of the two cover slots. A signal source is fed into the antenna structure through the feeding portion, the antenna structure, one of the two antenna slots, the one of the two cover slots are configured to generate a first frequency band, the antenna structure, another one of the two antenna slots, the another one of the two cover slots are configured to generate a second frequency band, and the antenna structure is configured to generate a third frequency band. A frequency range of the first frequency band, a frequency range of the second frequency band, and a frequency range of the third frequency band are not completely identical to each other.

Therefore, in the electronic device and antenna module provided by the present disclosure, the first excitation segment, the second excitation segment, and the connecting segment of the antenna structure are designed to cooperate with the long cover slot and the short cover slot, such that when the signal source is fed into the antenna structure through the feeding portion, the antenna module can generate three different frequency bands. In addition, the design of the bottom structure allows the frequency range of the antenna for different bands to be easily adjusted according to the material composition of the metal cover (e.g., the metal cover being made of pure metal, or the metal cover being mixed with non-metallic materials in addition to metal materials).

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
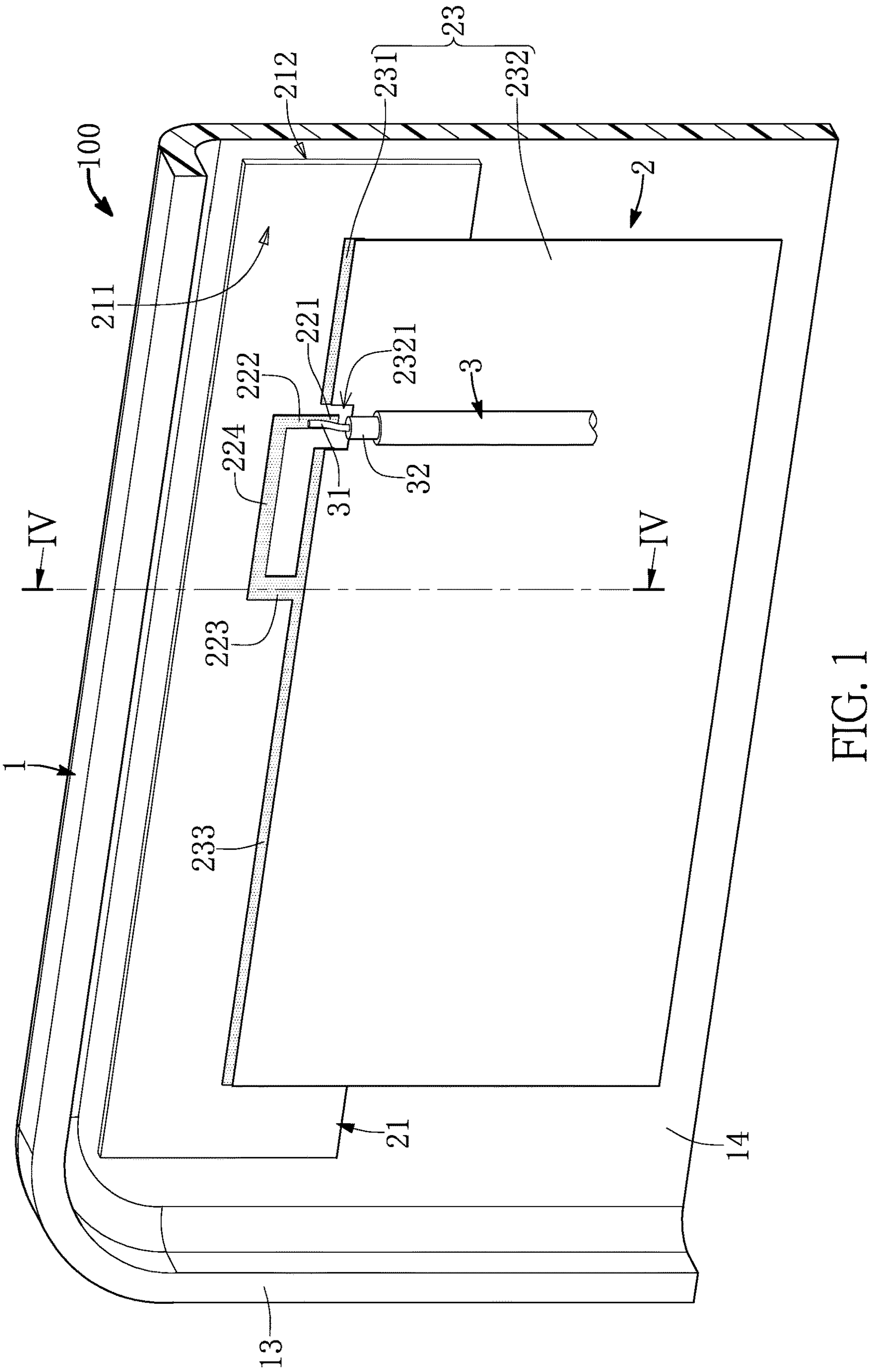
FIG. 1 is a partial schematic view of an electronic device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of “a,” “an” and “the” includes plural reference, and the meaning of “in” includes “in” and “on.” Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as “first,” “second” or “third” can be used to describe various components, signals or the like, which are for distinguishing one component/signal from another one only, and are not intended to, nor should be construed to impose any substantive limitations on the components, signals or the like.

Figure 2:
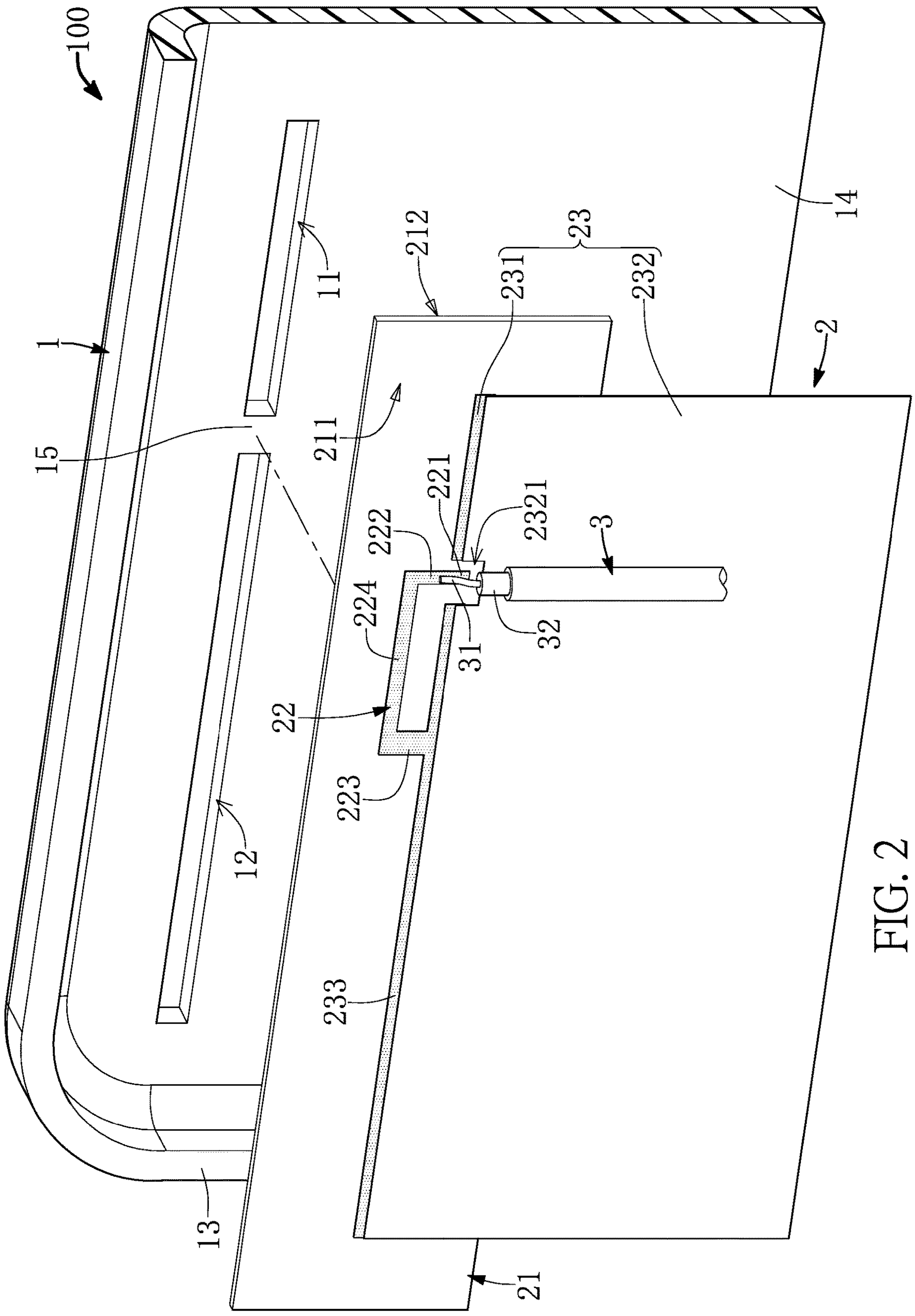
FIG. 2 is a partial schematic exploded view of the electronic device according to the first embodiment of the present disclosure.
Figure 3:
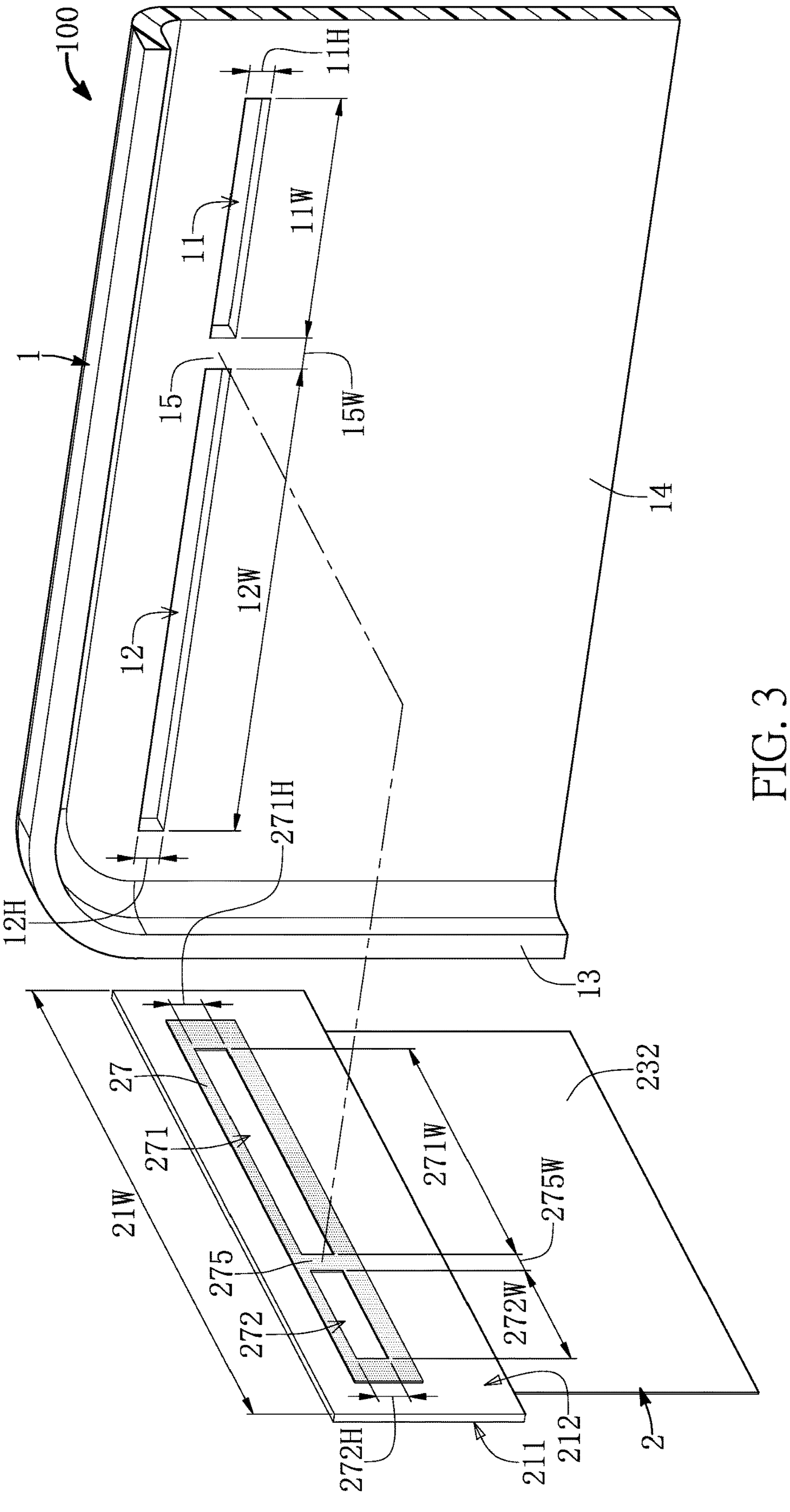
FIG. 3 is a partial schematic exploded view of the electronic device according to the first embodiment of the present disclosure.
Figure 4:
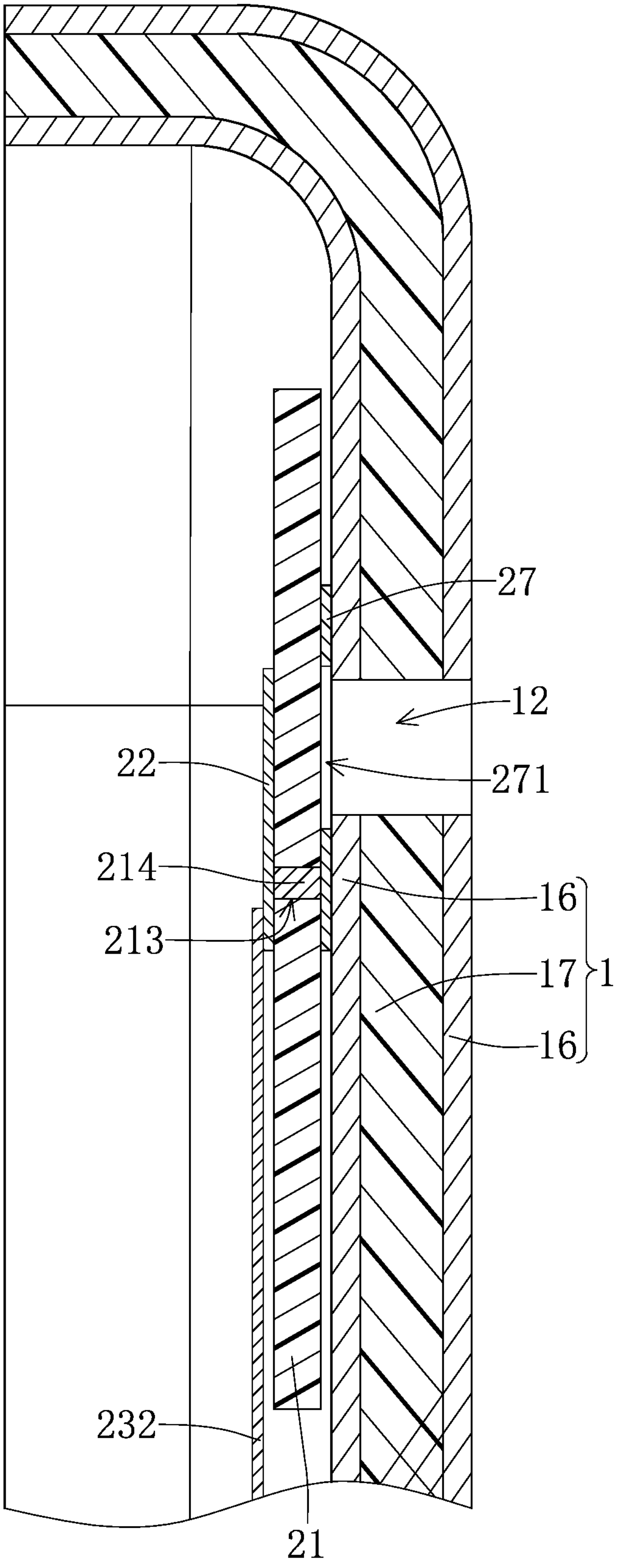
FIG. 4 is a schematic cross-sectional view taken along line IV-IV of FIG. 1.

Referring to FIG. 1 to FIG. 4, FIG. 1 is a partial schematic view of an electronic device according to a first embodiment of the present disclosure; FIG. 2 is a partial schematic exploded view of the electronic device according to the first embodiment of the present disclosure; FIG. 3 is another partial schematic exploded view of the electronic device according to the first embodiment of the present disclosure; and FIG. 4 is a schematic cross-sectional view taken along line IV-IV of FIG. 1.

The present disclosure provides an electronic device 100, which includes a metal cover 1 and an antenna module 2.

The electronic device 100 can be a smartphone, a tablet computer, or a laptop computer, but the present disclosure is not limited thereto. The metal cover 1 can be an upper cover or a back cover of the electronic device 100, but the present disclosure is not limited thereto.

The metal cover 1 has two cover slots. The two cover slots are respectively defined as a short cover slot 11 and a long cover slot 12. The short cover slot 11 penetrates through the metal cover 1, and the long cover slot 12 penetrates through the metal cover 1. In practice, any one of the short cover slot 11 and the long cover slot 12 can be a rectangular hole having an enclosed contour, but the shape of the short cover slot 11 and the shape of the long cover slot 12 are not limited thereto. A length 11W of the short cover slot 11 is less than a length 12W of the long cover slot 12. Moreover, a difference between the length 11W of the short cover slot 11 and the length 12W of the long cover slot hole 12 can be changed according to requirements, and the present disclosure is not limited thereto.

In the present embodiment, the short cover slot 11 and the long cover slot 12 are arranged side by side, and a short side of the short cover slot 11 and a short side of the long cover slot 12 are arranged adjacent to each other. However, the short cover slot 11 and the long cover slot 12 are not limited to being arranged side by side.

The antenna module 2 includes a substrate 21, an antenna structure 22, a grounding member 23, and a bottom structure 27. The substrate 21 is disposed on one side of the metal cover 1. The antenna structure 22 is a conductive structure, and the antenna structure 22 is formed on a side surface of the substrate 21. In practice, the substrate 21 can be a flame retardant 4 (FR4) substrate, a printed circuit board (PCB), or a flexible circuit board (FCB), according to requirements, and the present disclosure is not limited thereto. The antenna structure 22 can be a conductive sheet structure (e.g., a copper foil) that is formed on the side surface of the substrate 21. Two opposite width-side surfaces of the substrate 21 are a first side surface 211 and a second side surface 212, respectively. The antenna structure 22 is disposed on the first side surface 211, and the bottom structure 27 is electrically conductive and is disposed on the second side surface 212.

The antenna structure 22 defines a feeding portion 221. The feeding portion 221 is configured to connect a signal source, such that signals transmitted from the signal source are fed into the antenna structure 22 through the feeding portion 221. The antenna structure 22 includes a first excitation segment 222, a second excitation segment 223, and a connecting segment 224. Two ends of the connecting segment 224 are respectively connected to the first excitation segment 222 and the second excitation segment 223. The first excitation segment 222, the second excitation segment 223, and the connecting segment 224 are integrally formed on the substrate 21. The first excitation segment 222 extends from one end of the connecting segment 224 in an extending direction, and the second excitation segment 223 extends from another end of the connecting segment 224 in the extending direction. The first excitation segment 222, the second excitation segment 223, and the connecting segment 224 are jointly formed as an inverted U-shaped structure. The feeding portion 221 is arranged on the first excitation segment 222.

In a specific embodiment, the grounding member 23 is a conductive structure, and the grounding member 23 is provided for grounding. The grounding member 23 includes a first grounding structure 231, a grounding sheet body 232, and a second grounding structure 233. The first grounding structure 231 and the second grounding structure 233 are formed on the first side surface 211 of the substrate 21. The first grounding structure 231 and the second grounding structure 233 are arranged adjacent to the first excitation segment 222 and the second excitation segment 223, respectively. Each of the first grounding structure 231 and the second grounding structure 233 can be a rectangular sheet. In practice, the second grounding structure 233 can be connected to an end of the second excitation segment 223, and the second grounding structure 233 and the second excitation segment 223 can be integrally formed as a single one-piece structure.

The grounding sheet body 232 is coupled to the first grounding structure 231 and the second excitation segment 223. In practice, the first grounding structure 231 and the grounding sheet body 232 can be integrally connected to each other, or the grounding structure 231 and the grounding sheet body 232 can be fixed to each other in a soldering manner through solders, but the present disclosure is not limited thereto. In practice, a part of the grounding sheet body 232 can be fixed to the metal cover 1 through various manners.

As shown in FIG. 3, the bottom structure 27 is a conductive structure and the bottom structure 27 is connected to the antenna structure 22. The bottom structure 27 is grounded through the substrate 21. The bottom structure 27 includes two antenna slots, and lengths of the two antenna slots are different from each other. The two antenna slots are respectively defined as a long antenna slot 271 and a short antenna slot 272, the long antenna slot 271 and the short antenna slot 272 are respectively two enclosed holes (e.g., two rectangular holes respectively having an enclosed contour) that are independent from each other. An overall shape of the bottom structure 27 is formed approximately in the shape of a figure-8 that defines the two antenna slots.

As shown in FIG. 4, in one of specific embodiments, the substrate 21 can include a plurality of through-holes 213 penetrating therethrough. Each of the through-holes 213 is fully filled with one of a plurality of conductive structures 214. The through-holes 213 respectively correspond in position to the first grounding structure 231 and the second grounding structure 233, and the antenna structure 22 is connected to the bottom structure 27 through the conductive structures 214. The through-holes 213 and the conductive structures 214 can be formed together during the manufacturing process of the substrate 21, but the present disclosure is not limited thereto. Moreover, the connection manner between the bottom structure 27 and the antenna structure 22 is not limited by the present embodiment, and the bottom structure 27 and the antenna structure 22 can be connected to each other in other manners.

The forming manner and the sequence of forming for the first grounding structure 231, the second grounding structure 233, the antenna structure 22, the bottom structure 27, the through-holes 213, and the conductive structures 214 can be designed according to practical requirements, but the present disclosure is not limited thereto. For example, in one of embodiments, after the antenna structure 22, the bottom structure 27, and the ground member 23 are formed on the substrate 21, the through-holes 213 are formed in the first grounding structure 231 and the second grounding structure 233, and then the conductive structures 214 are formed in the through-holes 213.

It should be noted that, in different embodiments, the grounding member 23 can be in a configuration where the first grounding structure 231 is not included, the grounding sheet body 232 is directly connected to an end of the first excitation section 222, and the grounding sheet body 232 is directly connected to the bottom structure 27 through the conductive structures 214.

In practice, a cover intermediate structure 15 is arranged between the two cover slots, and the bottom structure 27 has an antenna intermediate structure 275 that is arranged between the two cover slots. In practice, a first length 15W of the cover intermediate structure 15 can be approximately equal to a second length 275W of the antenna intermediate structure 275. A length 12W of the long cover slot 12 is greater than a length 271W of the long antenna slot 271, and a length 11W of the short cover slot 11 is greater than a length 272W of the short antenna slot 272.

In addition, a height 271H of the long antenna slot 271 can be approximately equal to a height 272H of the short antenna slot 272. A height 12H of the long cover slot 12 can be approximately equal to a height 11H of the short cover slot 11. In practice, the height 271H of the long antenna slot 271, the height 272H of the short antenna slot 272, the height 12H of the long cover slot 12, and the height 11H of the short cover slot 11 can be approximately the same, but the present disclosure is not limited thereto. In different embodiments, the height 271H of the long antenna slot 271 and the height 272H of the short antenna slot 272 are be slightly greater than the height 12H of the long cover slot 12 and the height 11H of the short cover slot 11, respectively.

As shown in FIGS. 1 and 4, it should be noted that, in one of embodiments, the metal cover 1 can include a metal cladding layer structure 16 and a non-metallic inner layer structure 17. An outer surface of the metal cover 1 is arranged on the metal cladding layer structure 16, and the metal cladding layer structure 16 envelops the non-metallic inner structure 17. In other words, the non-metallic inner structure 17 is embedded in the metal cladding layer structure 16. For example, the metal cladding layer structure 16 is substantially made of aluminum-magnesium alloy material, and the non-metallic inner structure 17 is substantially made of plastic material. That is to say, the metal cover 1 can be a structure having an aluminum "skin" and a plastic "skeleton" that is covered by the aluminum skin. In a special embodiment, the non-metallic inner structure 17 of the metal cover 1 can be incompletely enveloped by the metal cladding layer structure 16, and a part of the non-metallic inner structure 17 is exposed from the metal cladding layer structure 16.

As shown in FIG. 1 to FIG. 5, the antenna module 2 is fixed on one side of the metal cover 1 that is formed with the short cover slot 11 and the long cover slot 12. Specifically, the bottom structure 27 faces toward the metal cover 1, the long antenna slot 271 faces toward the long cover slot 12, the short antenna slot 272 faces toward the short cover slot 11, and the antenna intermediate structure 275 substantially corresponds in position to the cover intermediate structure 15. A projection region defined by orthogonally projecting the first excitation segment 222 onto the metal cover 1 is at least partially overlapped with the short cover slot 11, and is at least partially overlapped with the short antenna slot 272. A projection region defined by orthogonally projecting the second excitation segment 223 onto the metal cover 1 is at least partially overlapped with the long cover slot 12, and is at least partially overlapped with the long antenna slot 271. In other words, as shown in the partial schematic side view of FIG. 5, the first excitation segment 222 of the antenna structure 22 is arranged across the short cover slot 11, and the second excitation segment 223 is arranged across the long cover slot 12.

Figure 5:
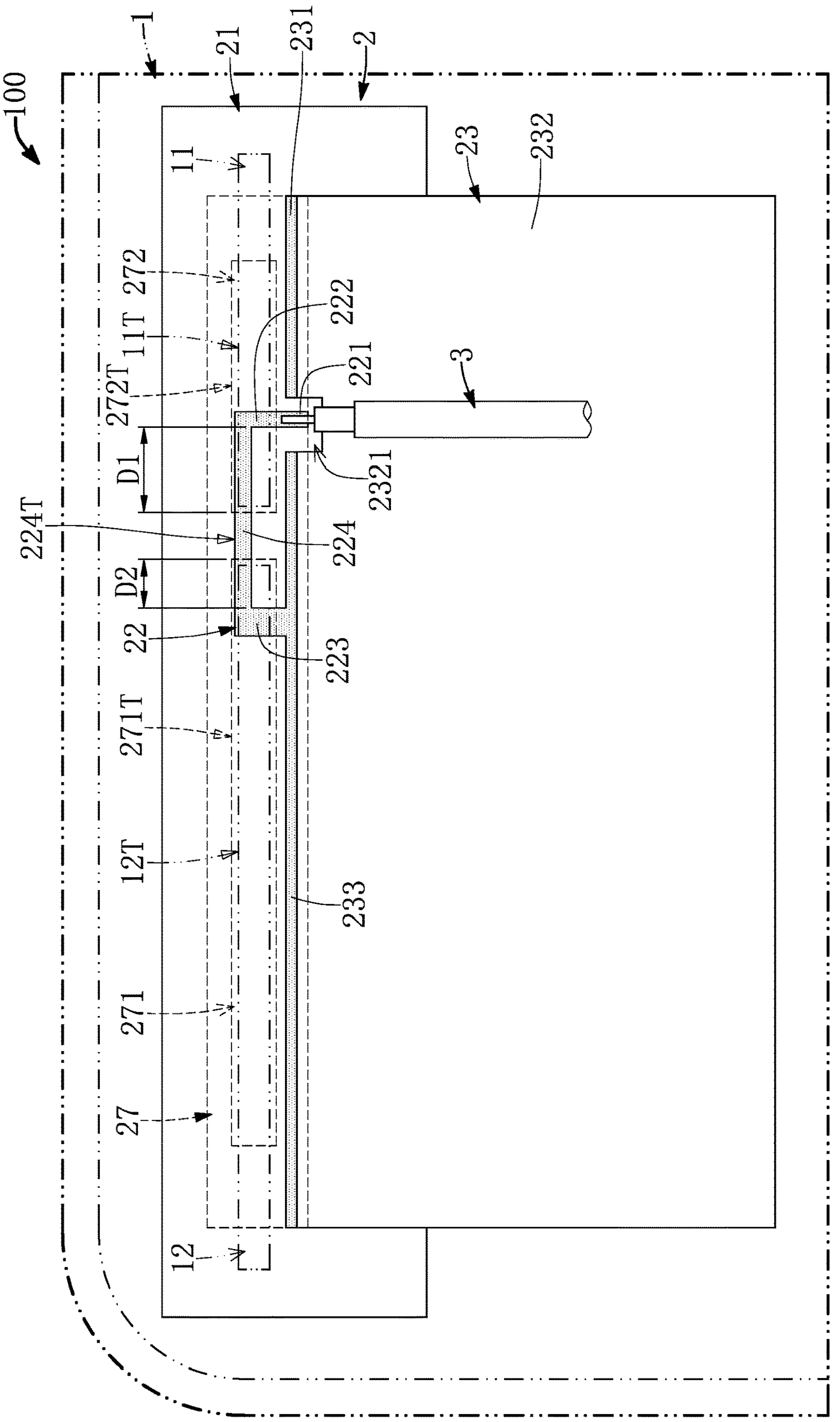
FIG. 5 is a partial schematic side view of the electronic device according to the first embodiment of the present disclosure.

It should be noted that, as shown in FIG. 5 of the present embodiment, an upper edge 224T of the connecting segment 224 is not overlapped with an upper edge 12T of the long cover slot 12, an upper edge 11T of the short cover slot 11, an upper edge 271T of the long antenna structure 271, and an upper edge 272T of the short antenna slot 272, but the present disclosure is not limited thereto. In different embodiments, the upper edge 224T of the connecting segment 224 can be overlapped with the upper edge 12T of the long cover slot 12, the upper edge 11T of the short cover slot 11, the upper edge 271T of the long antenna slot 271, and the upper edge 272T of the short antenna slot 272.

In summary, when a signal source is fed into the antenna structure 22 through the feeding portion 221, the antenna structure 22 is configured to interact with the short cover slot 11 and the short antenna slot 272 so as to generate a first frequency band, the antenna structure 22 is configured to interact with the long cover slot 12 and the long antenna slot 271 so as to generate a second frequency band, and the antenna structure 22 is configured to be resonated so as to generate a third frequency band. Moreover, frequency ranges respectively corresponding to the first frequency band, the second frequency band, and the third frequency band are not entirely identical to each other. Specifically, the frequency ranges respectively corresponding to the first frequency band, the second frequency band, and the third frequency band can be completely different from each other; or, the frequency ranges respectively corresponding to the first frequency band and the second frequency band can be partially overlapped with each other, and the frequency ranges respectively corresponding to the second frequency band and the third frequency band are partially overlapped with each other. In the embodiment where each of the long cover slot 12 and the short cover slot 11 is a rectangular hole having the enclosed contour, the length 11W of the short cover slot 11 can be within a range from ½ times to 4 times of a wavelength corresponding to a center frequency of the first frequency band, and the length 12W of the long cover slot 12 can be within a range from ½ times to 4 times of a wavelength of a center frequency of the second frequency band.

The electronic device 100 of the present disclosure further includes a coaxial cable 3. The coaxial cable 3 includes an internal conductor 31 and an external conductor 32, and the internal conductor 31 and the external conductor 32 are electrically isolated from each other through an insulation structure. The external conductor 32 is coupled to the first grounding structure 231, and the internal conductor 31 is coupled to the feeding portion 221 of the antenna structure 22. The external conductor 32 can be connected to the grounding sheet body 232 in a soldering manner through solders, and the external conductor 32 is electrically connected to the first grounding structure 231 through the grounding sheet body 232. The internal conductor 31 can be connected and fixed to the feeding portion 221 of the antenna structure 22 in a soldering manner through solders. However, the external conductor 32 of the coaxial cable 3 can be directly connected to the first grounding structure 231 without using the grounding sheet body 232 so as to achieve the same connection effect. It is worth mentioning that, the grounding sheet body 232 can further include a notch 2321. The notch 2321 corresponds in position to the feed portion 221, and the notch 2321 is used to prevent the positive pole and negative pole of the coaxial cable 3 from being connected to each other. In practice, a width of the notch 2321 is provided according to a position of the feed portion 221 and a position of the first grounding structure 231, but the present disclosure is not limited thereto. In a preferred embodiment, a distance between the feed portion 221 of the antenna structure 22 and the grounding member 23 that is connected to the coaxial cable 3 is not less than 2 mm.

Specifically, the electronic device 100 and the antenna module 2 provided by a specific embodiment of the present disclosure, a relevant personnel can change the frequency ranges respectively corresponding to the first frequency band, the second frequency band, and the third frequency bands by adjusting a position of the first excitation segment 222 relative to the short cover slot 11, adjusting a position of the second excitation segment 223 relative to the long cover slot 12, adjusting a position of the first excitation segment 222 relative to the short antenna slot 272, adjusting a position of the second excitation segment 223 relative to the long antenna slot 271, changing a shape of the first excitation segment 222, changing a shape of the second excitation segment 223, or changing an overall dimensions or a shape of the antenna structure 22.

Figure 6:
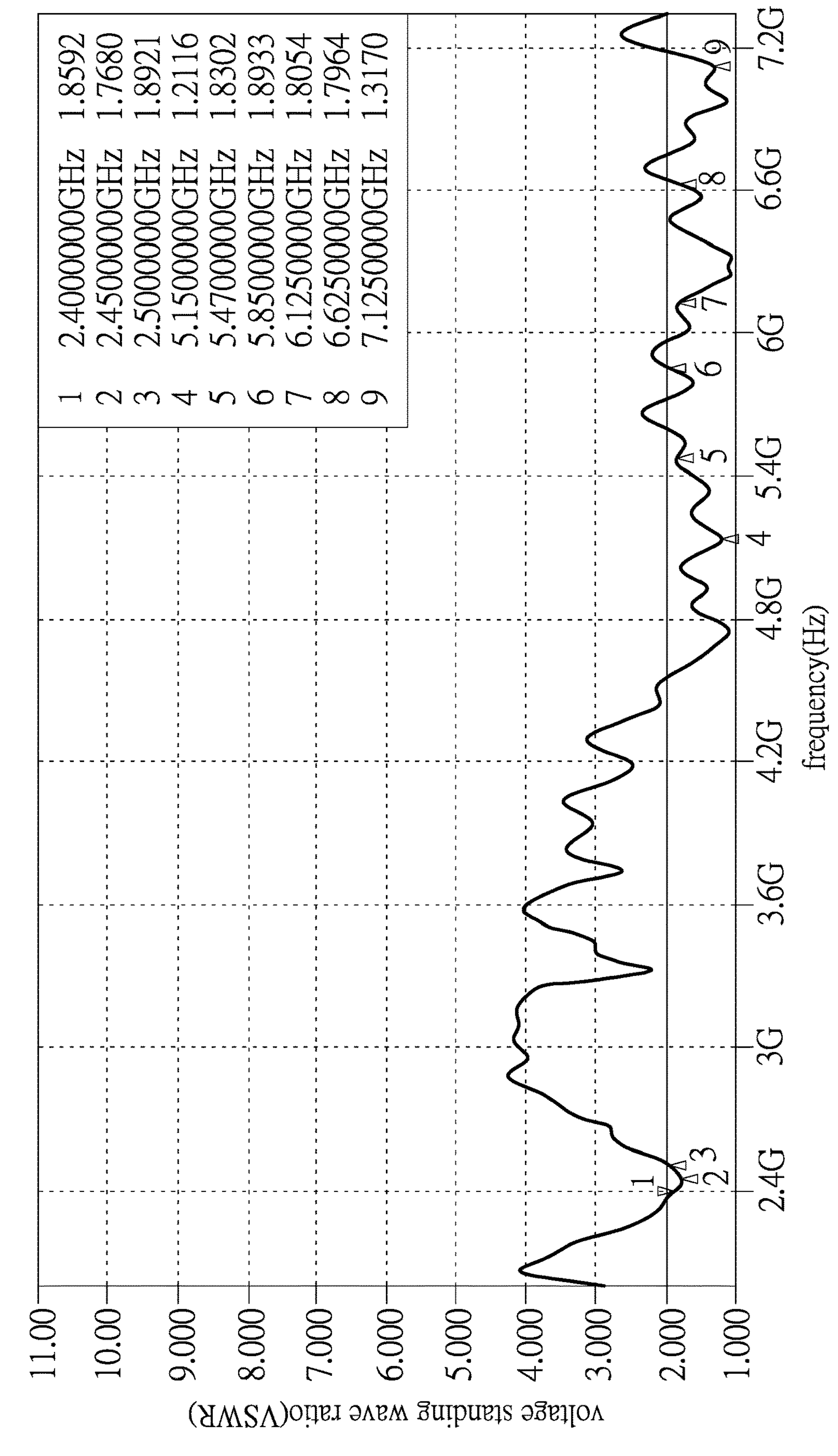
FIG. 6 is a voltage standing wave ratio (VSWR) chart of the electronic device according to the first embodiment of the present disclosure.

Please refer to FIG. 6, which shows a voltage standing wave ratio (VSWR) chart of the electronic device 100 according to the first embodiment of the present disclosure. As shown in FIG. 4, after the signal source is fed into the electronic device 100 of the present disclosure, a voltage standing wave ratio of the electronic device 100 at 2.4 GHz is 1.8592, the voltage standing wave ratio of the electronic device 100 at 2.5 GHz is 1.8921, the voltage standing wave ratio of the electronic device 100 at 5.15 GHz is 1.2116, the voltage standing wave ratio of the electronic device 100 at 5.85 GHz is 1.8933, the voltage standing wave ratio of the electronic device 100 at 6.125 GHz is 1.8054, and the voltage standing wave ratio of the electronic device 100 at 7.125 GHz is 1.3170. Therefore, the electronic device 100 and the antenna module 2 of the present disclosure can be provided to support a common broadband operations at 6 GHz (e.g., Wi-Fi 6E), 2.4 GHz and 5 GHz.

Figure 7:
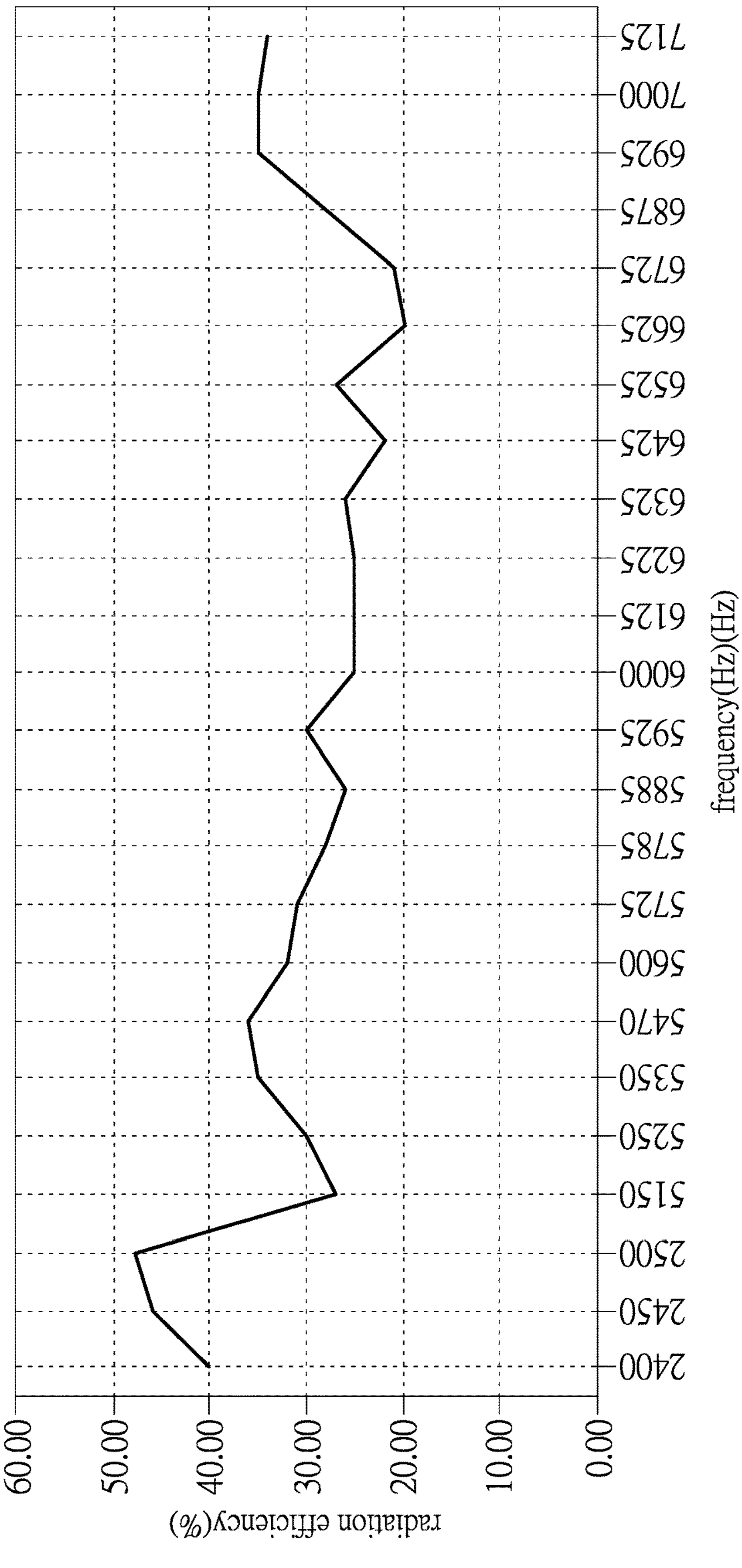
FIG. 7 is a radiation efficiency chart of the electronic device according to the first embodiment of the present disclosure.

Please refer to FIG. 7, which is a radiation efficiency chart of the electronic device 100 according to the first embodiment of the present disclosure. As shown in FIG. 7, the antenna module 2 of the present disclosure operated in any one of three frequency ranges of 6000-7125 MHZ, 2310-2600 MHz and 5150-5850 MHz has a radiation efficiency of more than 20%. Therefore, the antenna module 2 of the present disclosure already meets the application requirements of common frequencies such as 6 GHZ (e.g., Wi-Fi 6E), 2.4 GHz, and 5 GHz. It should be noted that, in the examples shown in FIG. 6 and FIG. 7, the metal cover 1 includes the metal cladding layer structure 16 and the non-metallic inner layer structure 17.

Please refer to FIG. 3 again, in order to enable the antenna structure 22 of the electronic device 100 to generate three different frequency bands of 6000-7125 MHz, 2310~2600 MHZ, and 5150~5850 MHz in applications where the metal cover 1 includes the metal cladding layer structure 16 and the non-metallic inner layer structure 17, a difference between the length 15W of the cover intermediate structure 15 and the second length 275W of the antenna intermediate structure 275 is less than 40% of the first length 15W, the length 271W of the long antenna slot 271 is greater than or equal to 80% of the length 12W of the long cover slot 12, and the length 272W of the short antenna slot 272 is greater than or equal to 80% of the length 11W of the short cover slot 11.

Please refer to FIG. 5 again, in order to enable the antenna structure 22 of the electronic device 100 to generate three different frequency bands of 6000-7125 MHz, 2310~2600 MHZ, and 5150~5850 MHz, the short cover slot 11 in practice is the rectangular hole having the enclosed contour, a shortest distance D1 between the first excitation segment 222 and one side of the short cover slot 11 is less than or equal to 10 mm, the long cover slot 12 is the rectangular hole having the enclosed contour, and a shortest distance D2 between the second excitation segment 223 and one side of the long cover slot 12 is less than or equal to 10 mm.

Please refer to FIG. 2 to FIG. 4 again, it should be noted that, in each figure of present embodiment, a length 21W of the substrate 21 is greater than a sum of the first length 15W of the cover intermediate structure 15, the length 11W of the short cover slot 11, and the length 12W of the long cover slot hole 12 (i.e., 21W>=15W+11W+12W). When the substrate 21 is fixed onto the metal cover 1, the substrate 21 correspondingly covers the long cover slot 12 and the short cover slot 11. However, the present disclosure is not limited to require the substrate 21 completely covering the long cover slot 12 and the short cover slot 11 when the substrate 21 is fixed onto one side of the metal cover 1. In other words, when the substrate 21 is fixed onto one side of the metal cover 1, as the conditions required by the present disclosure are described as follows: the projection region defined by orthogonally projecting the first excitation segment 222 onto the metal cover 1 is overlapped with the short cover slot 11, the projection region defined by orthogonally projecting the second excitation segment 223 onto the metal cover 1 is overlapped with the long cover slot 12, a projection region defined by orthogonally projecting the first excitation segment 222 onto the second side surface 212 of the substrate 21 is overlapped with the short antenna slot 272, and a projection region defined by orthogonally projecting the second excitation segment 223 onto the second side surface 212 of the substrate 21 is overlapped with the long antenna slot 271.

It should be noted that, when the electronic device 100 and the antenna module 2 are provided without the bottom structure 27 and are applied with the metal cover 1 having mixed non-metallic materials (e.g., the metal cover 1 having the aluminum "skin" and the plastic "skeleton"), the electronic device 100 and the antenna module 2 are difficult to meet the application requirements of 6 GHz (e.g., Wi-Fi 6E), 2.4 GHz and 5 GHz. In other words, no matter how the relevant personnel modifies the shape or the structure of the antenna module 2, the electronic device 100 and the antenna module 2 are difficult to achieve the frequency ranges of 6 GHZ (e.g., Wi-Fi 6E), 2.4 GHZ and 5 GHz. Conversely, the electronic device 100 and the antenna module 2 of the present disclosure can effectively meet the common application requirements of 6 GHZ (e.g., Wi-Fi 6E), 2.4 GHz and 5 GHz through a cooperation design of the antenna structure 22, the bottom structure 27 and the grounding member 23. In other words, if the metal cover 1 includes the metal cladding layer structure 16 and the non-metallic inner layer structure 17, the electronic device 100 and the antenna module 2 of the present disclosure can still meet the application requirements of 6 GHz (e.g., Wi-Fi 6E), 2.4 GHz, and 5 GHz by simply adjusting the antenna structure 22 and the bottom structure 27.

Specifically, a dielectric coefficient of the metal cover 1 only made of metal materials (e.g., the metal cover 1 having an aluminum skin and magnesium ribs) is completely different from that of the metal cover 1 made of metal materials mixed with non-metallic materials (e.g., the metal cover 1 having the aluminum "skin" and the plastic "skeleton"). When the metal cover 1 is mixed with non-metallic materials, the dielectric coefficient of the metal cover 1 can be changed according to the thickness of the non-metallic materials. Therefore, when the antenna module 2 is provided without the bottom structure 27 and is applied to the metal cover 1 that is only made of metal materials, and the antenna module 2 reaches the frequency ranges that complies with 6 GHz (e.g., Wi-Fi 6E), 2.4 GHz and 5 GHZ, the antenna module 2 can be directly applied with the metal cover 1 mixed with non-metal materials (e.g., the metal cover 1 with the aluminum "skin" and the plastic "skeleton"), and the antenna module 2 cannot be able to produce the same frequency band due to the change in the dielectric coefficient of the metal cover 1. That is to say, the antenna module 2 have a frequency offset issue, such that the antenna module 2 can not reach the frequency ranges of 6 GHZ (e.g., Wi-Fi 6E), 2.4 GHz and 5 GHz.

Figure 8:
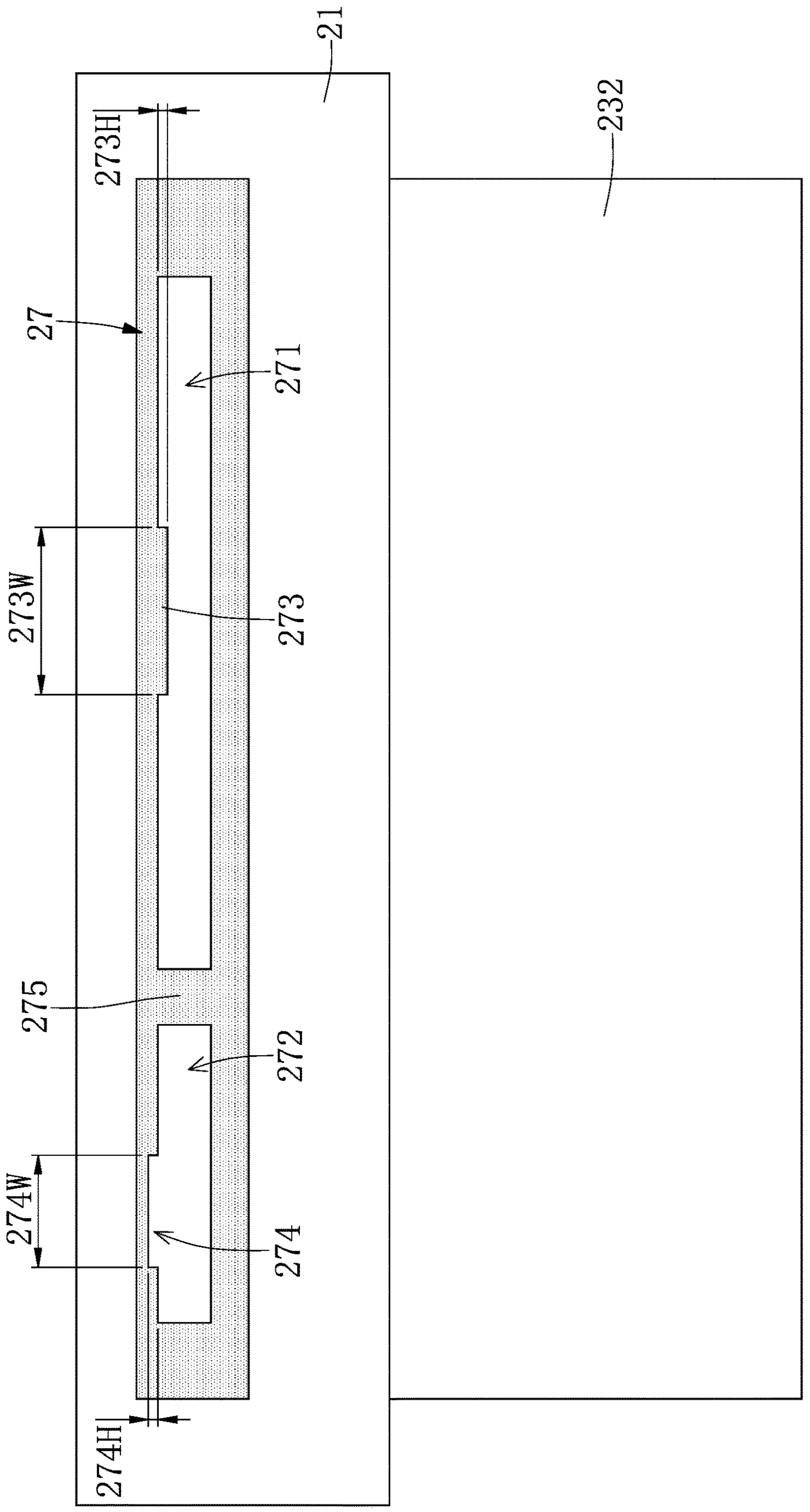
FIG. 8 is a schematic view showing a bottom structure of an antenna module according to a second embodiment of the present disclosure.
Figure 9:
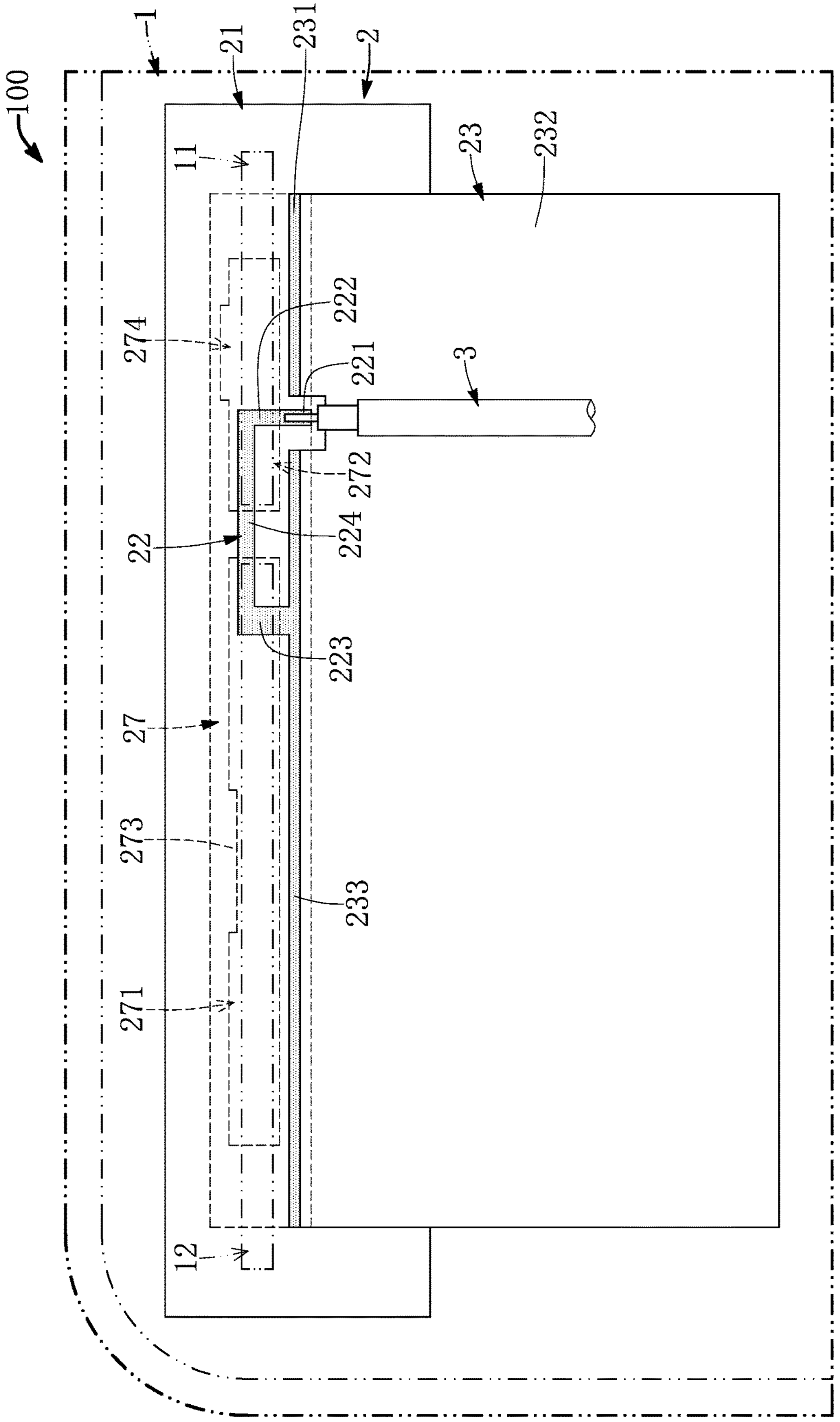
FIG. 9 is a partial schematic side view of the electronic device according to the second embodiment of the present disclosure.

Please refer to FIG. 8 and FIG. 9, FIG. 8 is a schematic view showing the bottom structure of the antenna module according to a second embodiment of the present disclosure, and FIG. 9 is a partial schematic side view of the electronic device according to the second embodiment of the present disclosure. The main difference between the present embodiment and the previous embodiment is described as follows: the bottom structure 27 of the present embodiment further includes two frequency-adjustment structures. The two frequency-adjustment structures are respectively a first bottom frequency-adjustment structure 273 and a second bottom frequency-adjustment structure 274. The first bottom frequency-adjustment structure 273 is formed by extending from an inner side edge of the long antenna slot 271 toward an opposite inner side edge of the long antenna slot 271, and an overall shape of the bottom frequency-adjustment structure 273 protrudes from a rectangular structure of the long antenna slot 271. A height 273H of the first bottom frequency-adjustment structure 273 is less than or equal to the height 271H of the long antenna slot 271. The second bottom frequency-adjustment structure 274 is formed by recessing in an inner side edge of the short antenna slot 272 along a direction away from an opposite inner side edge of the short antenna slot 272, and an overall shape of the second bottom frequency-adjustment structure 274 is recessed in a notch of the short antenna slot 272.

As shown in FIG. 9, after the antenna module 2 is fixed on the metal cover 1, a projection region defined by orthogonally projecting the first bottom frequency-adjustment structure 273 onto the metal cover 1 is not overlapped with the long cover slot 12, and a projection region defined by orthogonally projecting the second bottom frequency-adjustment structure 274 onto the metal cover 1 is not overlapped with the short cover slot 11.

In summary, the relevant personnel can adjust at least one of the shape of the first bottom frequency-adjustment structure 273, a length 273W of the first bottom frequency-adjustment structure 273, a position of the first bottom frequency-adjustment structure 273 in the long antenna slot 271, and a height 273H of the first bottom frequency-adjustment structure 273 so as to modify a low-frequency band (e.g., 2310 MHz-2600 MHZ) generated by the antenna module 2 and the metal cover 1. Similarly, the relevant personnel can adjust at least one of a shape of the second bottom frequency-adjustment structure 274, a length 274W of the second bottom frequency-adjustment structure 274, a position of the second bottom frequency-adjustment structure 274 in the long antenna slot 271, and a height 274H of the second bottom frequency-adjustment structure 274 so as to modify a 5G band (e.g., 5150 MHz-5850 MHZ) generated by the antenna module 2 and the metal cover 1. In other words, the relevant personnel can adjust the first bottom frequency-adjustment structure 273 and the second bottom frequency-adjustment structure 274 so as to correspondingly modify the frequency ranges of the antenna module 2 at 2.4 GHz and 5 GHz.

Figure 10:
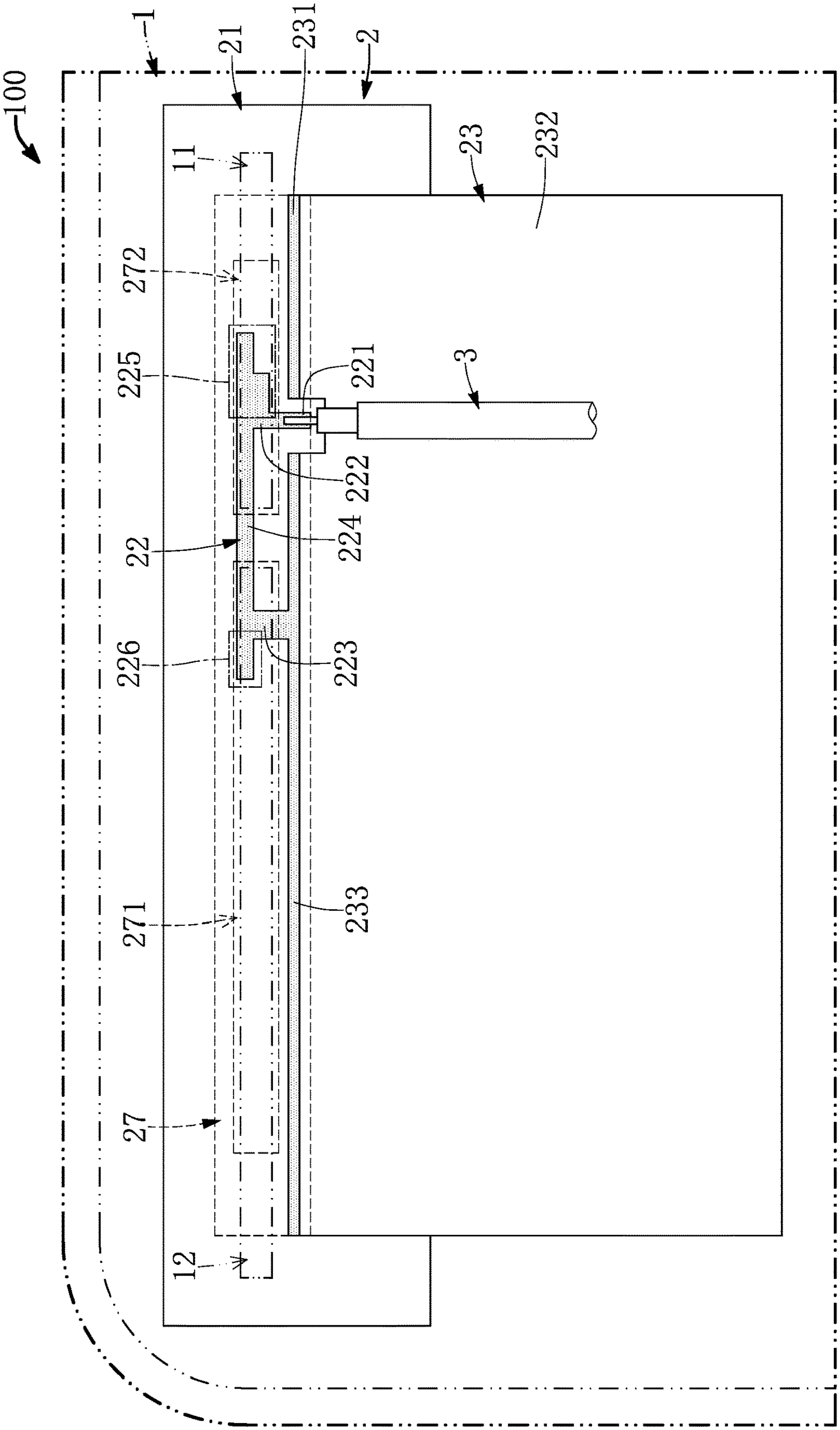
FIG. 10 is a partial schematic side view of the electronic device according to a third embodiment of the present disclosure.

Please refer to FIG. 10, which shows a partial schematic side view of the electronic device according to a third embodiment of the present disclosure. A difference between the present embodiment and the first embodiment is described as follows: the antenna structure 22 of the present embodiment further includes two frequency-adjustment segments. The two frequency-adjustment segments are respectively defined as a first frequency-adjustment segment 225 and a second frequency-adjustment segment 226. The first frequency-adjustment segment 225 is connected to the connecting segment 224 and the first excitation segment 222, and a projection region defined by orthogonally projecting the first frequency-adjustment segment 225 onto the metal cover 1 is at least partially overlapped with the short cover slot 11. In addition, the relevant personnel can adjust at least one of a shape and a size of the first frequency-adjustment segment 225 and a position of the first frequency-adjustment segment 225 with respect to the short cover slot 11 so as to modify the frequency range of the first frequency band generated by the antenna module 2 when the signal source is fed into the antenna module 2. In other words, the first frequency-adjustment segment 225 is mainly provided to modify the frequency range of the antenna module 2 in 6 GHz (e.g., Wi-Fi 6E).

The second frequency-adjustment segment 226 is connected to the connecting segment 224 and the second excitation segment 223, and a projection region defined by orthogonally projecting the second frequency-adjustment segment 226 onto the metal cover 1 is at least partially overlapped with the long cover slot 12. In addition, the relevant personnel can adjust at least one of a shape and a size of the second frequency-adjustment segment 226 and a position of the second frequency-adjustment segment 226 with respect to the long cover slot 12 so as to modify the frequency range of the second frequency band generated by the antenna module 2 when the signal source is fed into the antenna module 2. In other words, the second frequency-adjustment segment 226 is mainly provided to modify the frequency range of the antenna module 2 at 2.4 GHz. Regarding the drawings of present embodiment, the shapes of the first frequency-adjustment segment 225 and the second frequency-adjustment segment 226 can be designed according to requirements, but the present disclosure is not limited thereto.

Figure 11:
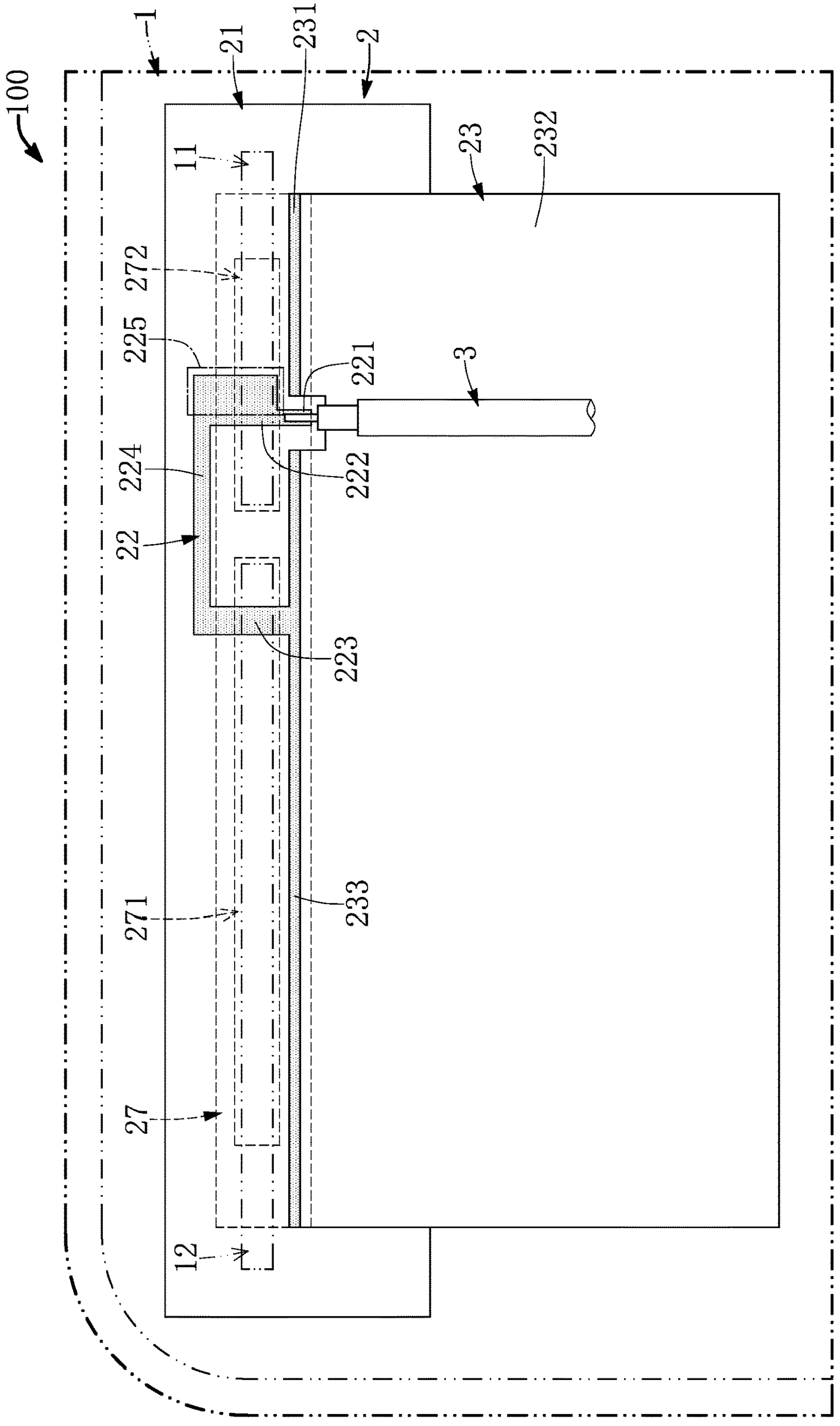
FIG. 11 is a partial schematic side view of the electronic device according to a fourth embodiment of the present disclosure.

Please refer to FIG. 11, which shows a partial schematic side view of the electronic device according to a fourth embodiment of the present disclosure. A difference between the present embodiment and the first embodiment is described as follows: a projection region defined by orthogonally projecting the connecting segment 224 of the antenna structure 22 onto the metal cover 1 (as show in FIG. 2) can be not overlapped with the long cover slot 12, the short cover slot 11, the long antenna slot 271, and the short antenna slot 272. Furthermore, the antenna structure 22 further includes the first frequency-adjustment segment 225. Regarding the description of the first frequency-adjustment segment 225, please refer to the third embodiment, and the present embodiment is not described herein for the sake of brevity. The shape and size of the first frequency-adjustment segment 225 can be changed according to the frequency band generated by the antenna module 2 and the metal cover 1, and are not limited by present embodiment or the third embodiment.

Figure 12:
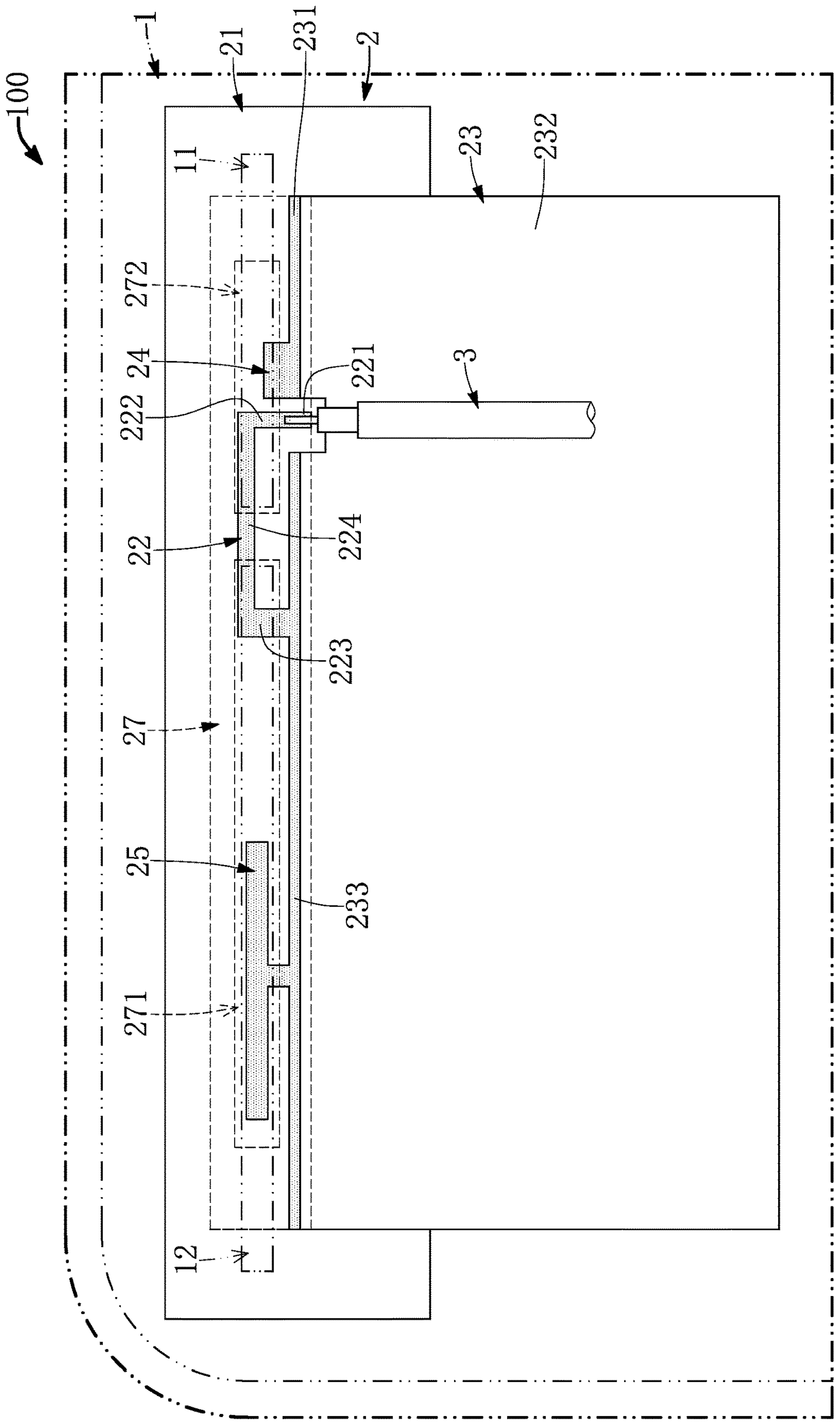
FIG. 12 is a partial schematic side view of the electronic device according to a fifth embodiment of the present disclosure.

Please refer to FIG. 12, which shows a partial schematic side view of the electronic device according to a fifth embodiment of the present disclosure. A difference between the present embodiment and the previous embodiment is described as follows: the antenna structure 22 of the present embodiment further includes two frequency-adjustment supports. The two frequency-adjustment supports are respectively defined as a first frequency-adjustment support 24 and a second frequency-adjustment support 25. The first frequency-adjustment support 24 is connected to the first grounding structure 231, and the first frequency-adjustment support 24 is coupled to the grounding sheet body 232. The second frequency-adjustment support 25 is connected to the second grounding structure 233, and the second frequency-adjustment support 25 is coupled to the grounding sheet body 232.

A projection region defined by orthogonally projecting the first frequency-adjustment support 24 onto the metal cover 1 is at least partially overlapped with the short cover slot 11 and the short antenna slot 272, and a projection region defined by orthogonally projecting the second frequency-adjustment support 25 onto the metal cover 1 is at least partially overlapped with the long cover slot 12 and the long antenna slot 271. In practice, the first frequency-adjustment support 24 and the first grounding structure 231 can be integrally formed as a single one-piece structure, and the second frequency-adjustment support 25 and the second grounding structure 233 can be integrally formed as a single one-piece structure. In different embodiments, the first grounding structure 231, the grounding sheet body 232, the second grounding structure 233, the first frequency-adjustment support 24, and the second frequency-adjustment support 25 can be integrally formed as a single one-piece structure. In practice, the relevant personnel can adjust at least one of a shape and a size of the first frequency-adjustment support 24 and a position of the first frequency-adjustment support 24 with respect to the short cover slot 11 and the short antenna slot 272 so as to modify the frequency range corresponding to the first frequency band generated by a cooperation of the antenna structure 22, the short cover slot 11, and the short antenna slot 272 when the signal source is fed into the antenna structure 22. In addition, the relevant personnel can adjust at least one of a shape and a size of the second frequency-adjustment support 25 and a position of the second frequency-adjustment support 25 with respect to the long cover slot 12 and the long antenna slot 271 so as to modify the frequency range corresponding to the second frequency band generated by a cooperation of the antenna structure 22, the long cover slot 12, and the long antenna slot 271 when the signal source is fed into the antenna structure 22.

Figure 13:
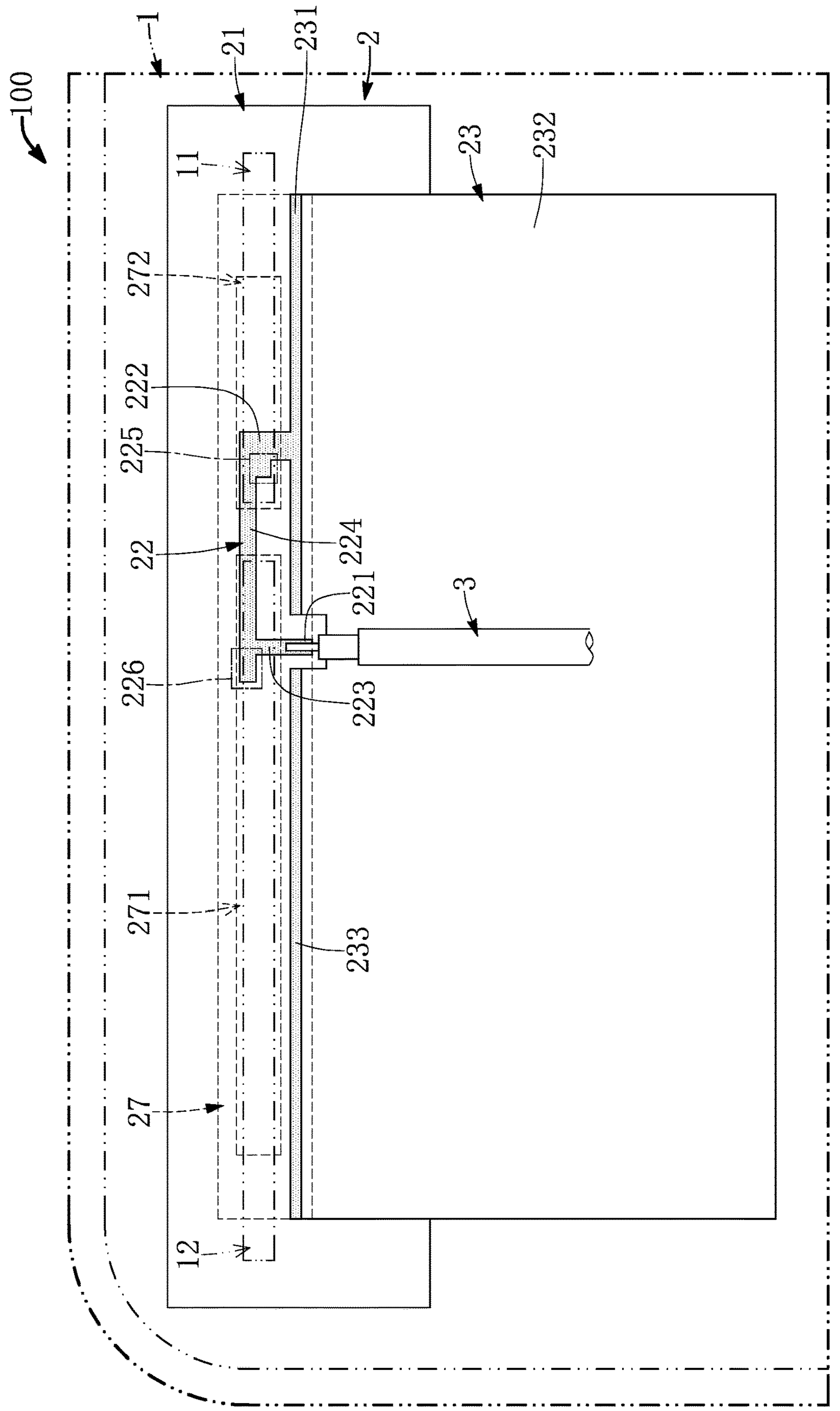
FIG. 13 is a partial schematic view of the electronic device according to a sixth embodiment of the present disclosure.

Please refer to FIG. 13, which shows a partial schematic view of the electronic device according to a sixth embodiment of the present disclosure. A maximum difference between the present embodiment and the previous embodiment is described as follows: the feeding portion 221 is arranged on an end of the second excitation segment 223 that is opposite to another end of the second excitation segment 223 connected to the connecting segment 224, and the feeding portion 221 is correspondingly arranged adjacent to the long cover slot 12. Another difference between the present embodiment and the previous embodiment is described as follows: the feeding portion 221 is disposed on the first excitation segment 222.

In practice, if the feeding portion 221 is disposed on the first excitation segment 222, the antenna structure 22 is configured to enhance performance in the second frequency band (e.g., the efficiency of the antenna structure 22 in the second frequency band being enhanced). Similarly, if the feeding portion 221 is disposed on the second excitation segment 223, the antenna structure 22 is configured to enhance performance in the first frequency band. More specifically, the feeding portion 221 can be provided to enhance the performance of the antenna module 2 at 2.4 GHz by being disposed on the first excitation segment 222. The feeding portion 221 can be provided to enhance the performance of the antenna module 2 at a frequency band of 6 GHz (e.g., Wi-Fi 6E) by being disposed on the second excitation segment 223.

Another difference between the present embodiment and the previous embodiment is described as follows: the first frequency-adjustment segment 225 is arranged on a connecting position of the first excitation segment 222 and the connecting segment 224, the second frequency-adjustment segment 226 and the second excitation segment 223 are connected to each other, and the second frequency-adjustment segment 226 is arranged on a connecting position of the second excitation segment 223 and the connecting segment 224. More specifically, the first frequency-adjustment segment 225 can be a rectangular structure, a short side of the first frequency-adjustment segment 225 and the connecting segment 224 are connected to each other, and a long side of the first frequency-adjustment segment 225 and the first excitation segment 222 are connected to each other. The second frequency-adjustment segment 226 can be a rectangular structure, and a short side of the second frequency-adjustment segment 226 and the connecting segment 224 are connected to each other.

In summary, in a specific embodiment, the relevant personnel can adjust shapes, sizes and positions of the first frequency-adjustment segment 225 and the second frequency-adjustment segment 226 so as to slightly modify the frequency range of the first frequency band, the frequency range of the second frequency band, and frequency range of the third frequency band that are generated by the antenna module 2. That is to say, the shapes, the sizes, and the positions of the first frequency-adjustment segment 225 and the second frequency-adjustment segment 226 shown in the figure of the present embodiment are just one of implementation modes, and the actual application is not limited thereto.

Figure 14:
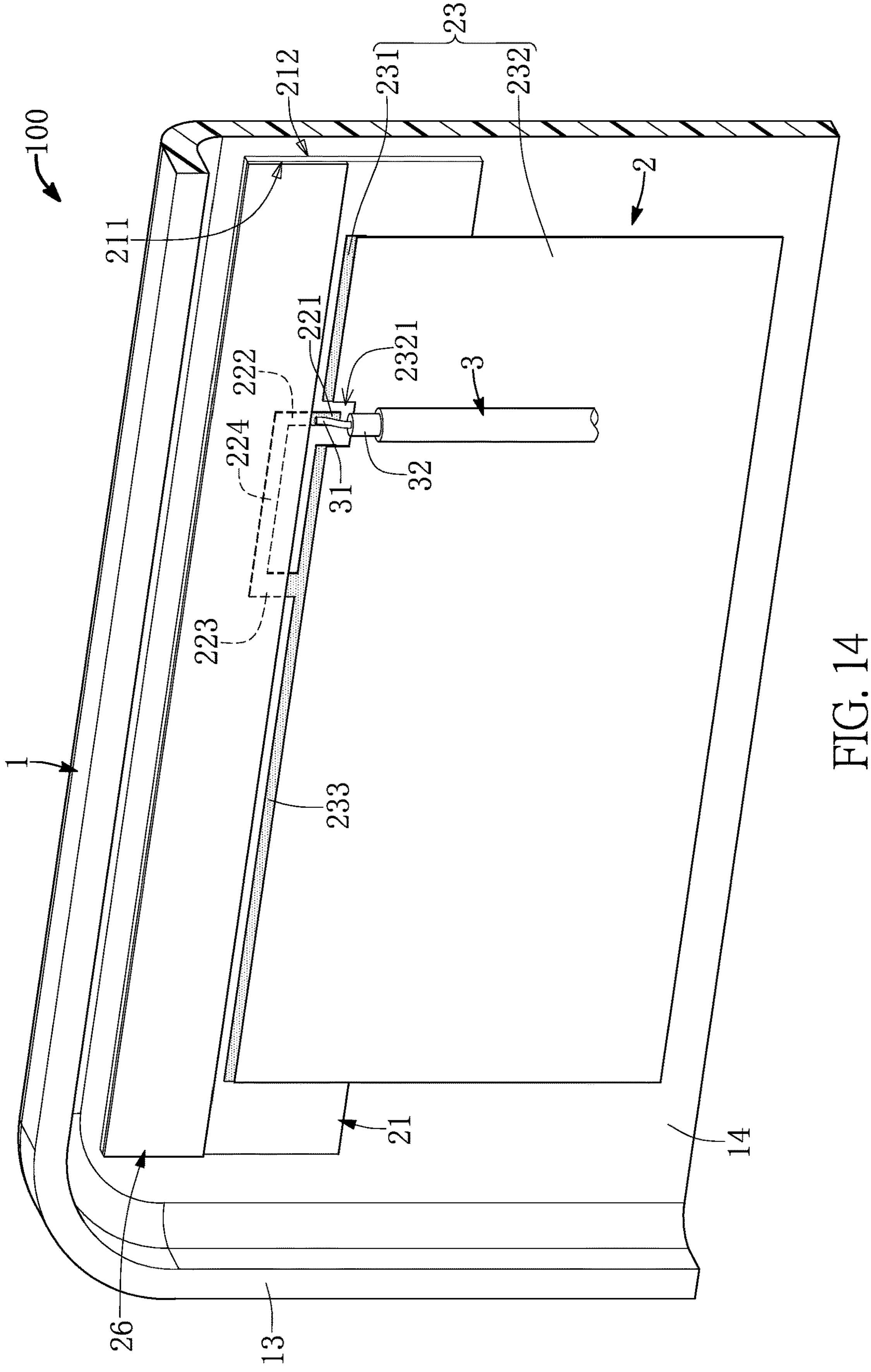
FIG. 14 is a partial schematic view of the electronic device according to a seventh embodiment of the present disclosure.
Figure 15:
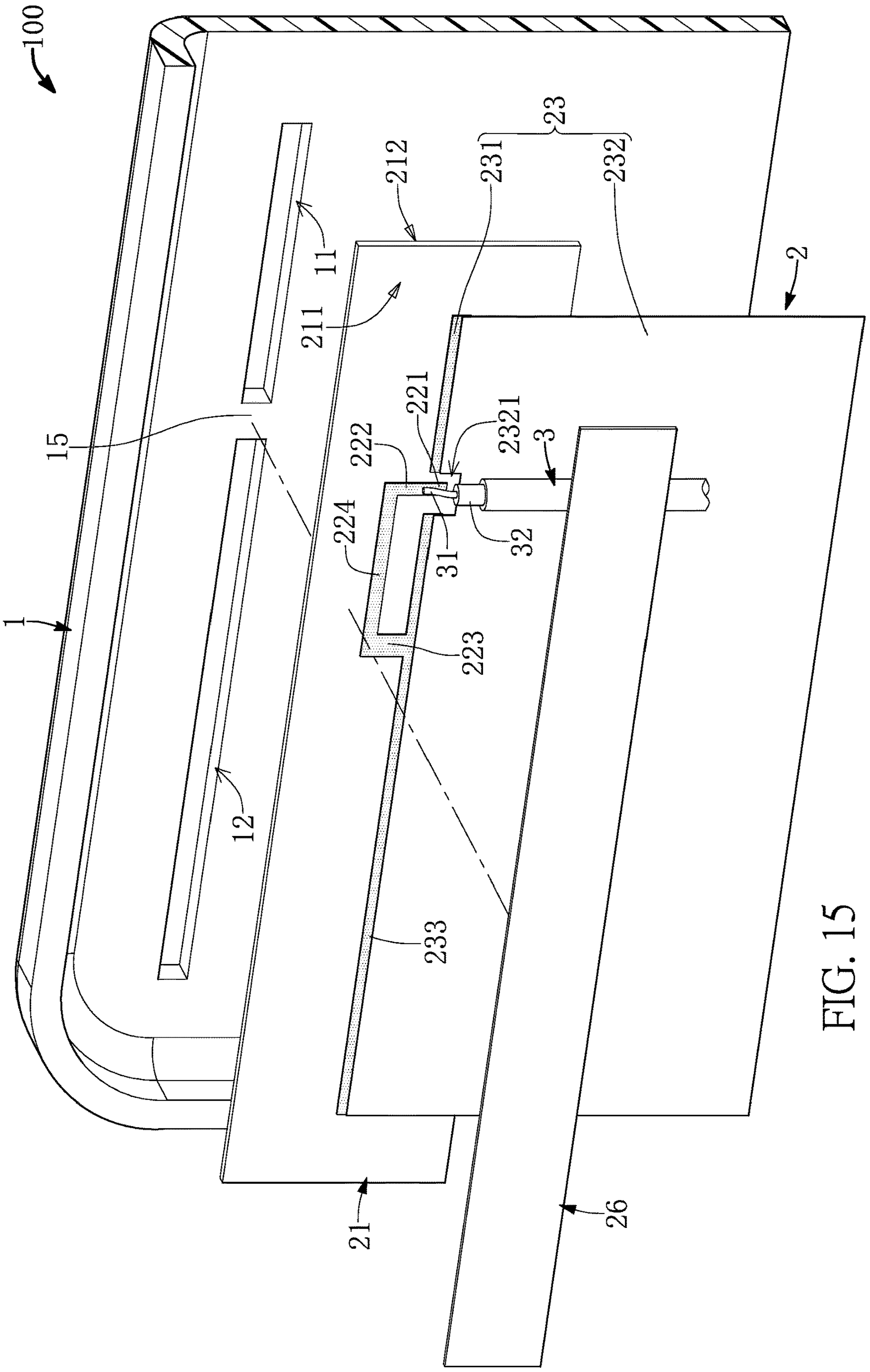
FIG. 15 is a partial schematic exploded view of the electronic device according to the seventh embodiment of the present disclosure.

Please refer to FIG. 14 and FIG. 15, FIG. 14 is a partial schematic view of the electronic device according to a seventh embodiment of the present disclosure, and FIG. 15 is a partial schematic exploded view of the electronic device according to the seventh embodiment of the present disclosure. A difference between the present embodiment and the first embodiment is described as follows: the antenna module 2 of the present embodiment further includes an auxiliary frequency-adjustment member 26. The auxiliary frequency-adjustment member 26 is disposed on a side surface of the substrate 21, and the antenna structure 22 is arranged between the auxiliary frequency-adjustment member 26 and the substrate 21. The auxiliary frequency-adjustment member 26 is a dielectric material. For example, the auxiliary frequency-adjustment member 26 can be a component composed of polymer, ceramic or other composite materials. When the auxiliary frequency-adjustment member 26 is fixed on the substrate 21, the auxiliary frequency-adjustment member 26 correspondingly shields at least part of the first excitation segment 222, at least part of the second excitation segment 223, and at least part of the connecting segment 224.

In practice, after the relevant personnel can select the auxiliary frequency-adjustment member 26 having different dielectric constants for adjusting the signal source to feed into the antenna module 2, the antenna module 2 generates the frequency range corresponding to the first frequency band, the frequency range corresponding to the second frequency band, and the frequency range corresponding to the third frequency band. In addition, in practice, the substrate 21 can be fixed to the metal cover 1 through screws, and the auxiliary frequency-adjustment member 26 can include a threaded hole that is not cooperated with the screws, so that the screws do not need to be threaded to the auxiliary frequency-adjustment member 26. It should be noted that, the auxiliary frequency-adjustment member 26 of the present embodiment can be combined with any one of the second to sixth embodiments so as to jointly form a new embodiment.

Figure 16:
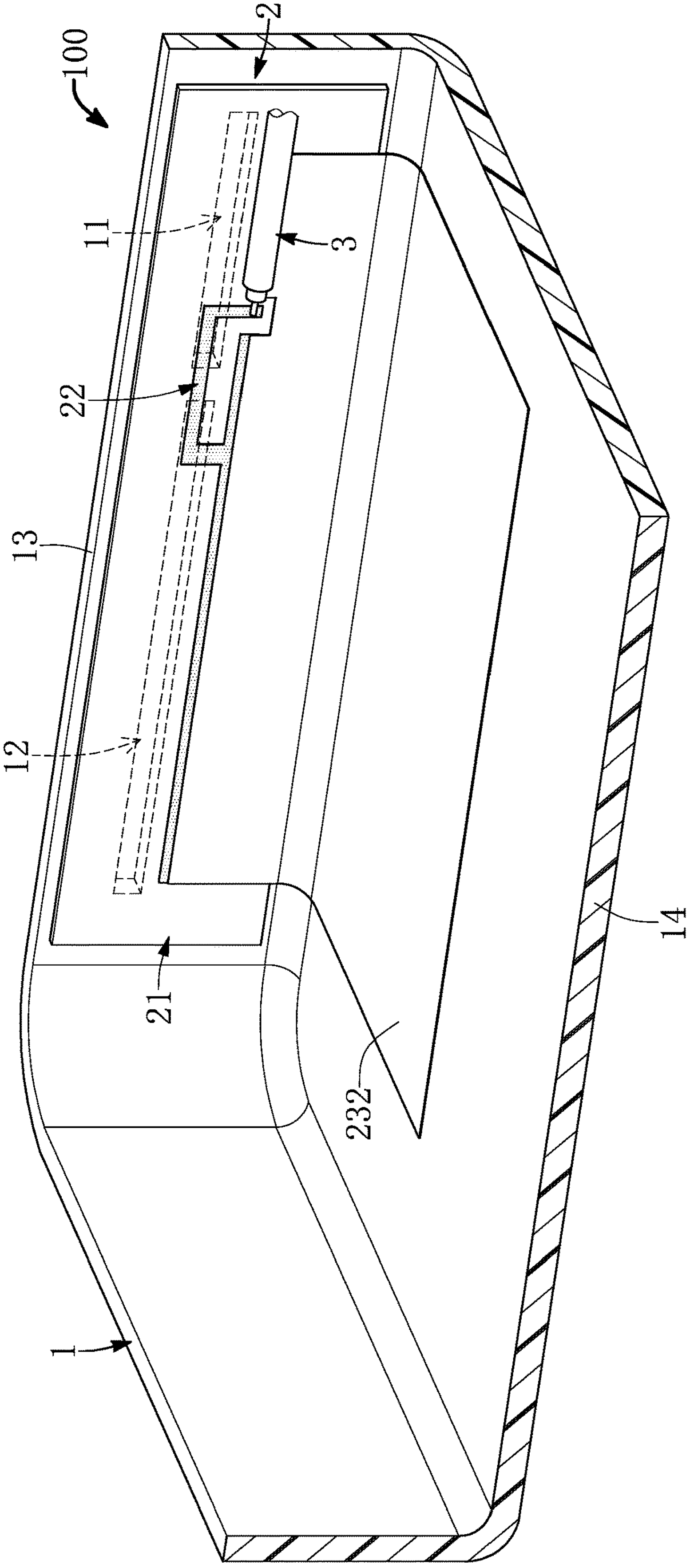
FIG. 16 is a schematic view of the electronic device according to an eighth embodiment of the present disclosure.

Please refer to FIG. 1, FIG. 2, and FIG. 16, FIG. 16 is a schematic view of the electronic device according to an eighth embodiment of the present disclosure. As shown FIG. 1 and FIG. 2, in the aforementioned embodiments, the short cover slot 11 and the long cover slot 12 are formed on a wide side wall 14 of the metal cover 1, and the substrate 21 is disposed on the wide side wall 14 of the metal cover 1. In the present embodiment, the short cover slot 11 and the long cover slot 12 are formed on a narrow side wall 13 of the metal cover 1, and the substrate 21 is disposed on the narrow side wall 13 of the metal cover 1. A part of the grounding sheet body 232 of the grounding member 23 can be disposed on the wide side wall 14 of the metal cover 1. In other words, as long as the short cover slot 11 and the long cover slot 12 can be cooperated with the antenna module 2 to generate the frequency band of 6 GHz (e.g., Wi-Fi 6E), the frequency band of 2.4 GHZ, and the frequency band of 5 GHZ, the short cover slot 11 and the long cover slot 12 can be disposed on any position of the metal cover 1.

BENEFICIAL EFFECTS OF THE EMBODIMENTS

In conclusion, in the electronic device and the antenna module provided by the present disclosure, after the signal source is fed into the antenna structure, the antenna module can generate three different frequency bands, thereby being applied to the electronic device having a small size or a small installation space. In addition, the electronic device and the antenna module of the present disclosure can be provided to generate the frequency bands of 6 GHz (e.g., Wi-Fi 6E), 2.4 GHZ, and 5 GHz through the design of the bottom structure when the metal cover includes the metal cladding layer structure and the non-metallic inner layer structure.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An electronic device, comprising:

a metal cover having two cover slots arranged side by side and penetrating therethrough, wherein lengths of the two cover slots are different from each other; and an antenna module including:

a substrate disposed on one side of the metal cover, wherein the substrate has a first side surface and a second side surface that is opposite to the first side surface;

an antenna structure being a conductive structure and formed on the first side surface, wherein the antenna structure defines a feeding portion, and the antenna structure includes:

a first excitation segment, wherein a projection region defined by orthogonally projecting the first excitation segment onto the metal cover is at least partially overlapped with one of the two cover slots;

a second excitation segment, wherein a projection region defined by orthogonally projecting the second excitation segment onto the metal cover is at least partially overlapped with another one of the two cover slots; and a connecting segment that connects the first excitation segment and the second excitation segment; and a bottom structure being electrically conductive and disposed on the second side surface, wherein the bottom structure is connected to the antenna structure, and the bottom structure is grounded through the substrate, and wherein the bottom structure has two antenna slots, and lengths of the two antenna slots are different from each other;

wherein, when a signal source is fed into the antenna structure through the feeding portion, the antenna structure, one of the two antenna slots, and the one of the two cover slots are configured to generate a first frequency band, the antenna structure, another one of the two antenna slots, and the another one of the two cover slots are configured to generate a second frequency band, and the antenna structure is configured to generate a third frequency band, and wherein a frequency range of the first frequency band, a frequency range of the second frequency band, and a frequency range of the third frequency band are not completely identical to each other.

2. The electronic device according to claim 1, wherein the metal cover includes a metal cladding layer structure and a non-metallic inner layer structure, and wherein an outer surface of the metal cover is arranged on the metal cladding layer structure, and the metal cladding layer structure envelops the non-metal inner structure.

3. The electronic device according to claim 2, wherein the frequency range of the first frequency band is within a range from 6000 MHz to 7125 MHZ, the frequency range of the second frequency band is within a range from 2310 MHz to 2600 MHZ, and the frequency range of the third frequency band is within a range from 5150 MHz to 5850 MHz.

4. The electronic device according to claim 1, wherein the two cover slots are a short cover slot and a long cover slot, and a length of the short cover slot is less than a length of the long cover slot, wherein the two antenna slots are a short antenna slot and a long antenna slot, the short antenna slot faces toward the short cover slot, and the long antenna slot faces toward the long cover slot, and wherein the length of the short antenna slot is greater than or equal to 80% of the length of the short cover slot, and the length of the long antenna slot is greater than or equal to 80% of the length of the long cover slot.

5. The electronic device according to claim 4, wherein the short cover slot is a rectangular hole, and the length of the short cover slot is within a range from ½ times to 4 times of a wavelength corresponding to a center frequency of the first frequency band, wherein the long cover slot is a rectangular hole, and the length of the long cover slot is within a range from ½ times to 4 times of the wavelength of the center frequency of the first frequency band, and wherein each of the short antenna slot and the long antenna slot is a rectangular hole.

6. The electronic device according to claim 4, wherein the metal cover includes a cover intermediate structure arranged between the two cover slots, and the antenna module includes an antenna intermediate structure arranged between the two cover slots, wherein a difference between a length of the cover intermediate structure and a length of the antenna intermediate structure is less than 40% of the length of the cover intermediate structure.

7. The electronic device according to claim 1, wherein the two cover slots are a short cover slot and a long cover slot, and a length of the short cover slot is less than a length of the long cover slot, wherein the two antenna slots are a short antenna slot and a long antenna slot, the short antenna slot faces toward the short cover slot, and the long antenna slot faces toward the long cover slot, and wherein a width of the short antenna slot is greater than or equal to 80% of a width of the short cover slot, a width of the long antenna slot is greater than or equal to 80% of a width of the long cover slot.

8. The electronic device according to claim 1, wherein the antenna module further includes at least one frequency-adjustment structure connected to the bottom structure, wherein the at least one frequency-adjustment structure is formed by extending from an inner side edge of one of the two antenna slots towards an opposite inner side edge of the one of the two antenna slots, or the at least one frequency-adjustment structure is formed by recessing the inner side edge of one of the two antenna slots towards a direction away from the opposite inner side edge of the one of the two antenna slots, and wherein a length of the at least one frequency-adjustment structure is less than a length of the one of the two antenna slots, and a height of the at least one frequency-adjustment structure is less than a height of the one of the two antenna slots.

9. The electronic device according to claim 1, wherein the antenna module further includes a grounding member, and the bottom structure is connected to the grounding member through the substrate, and wherein the grounding member is connected to one of the first excitation segment and the second excitation segment, and the feeding portion is arranged on another one of the first excitation segment and the second excitation segment.

10. The electronic device according to claim 9, wherein the substrate has a plurality of through-holes penetrating therethrough and arranged adjacent to a portion of the grounding member that is connected to the antenna structure, and each of the through-holes is fully filled with one of a plurality of conductive structures, and wherein the grounding member, the antenna structure, and the bottom structure are electrically coupled to each other through the conductive structures in the through-holes.

11. An antenna module for being fixed on a metal cover, the metal cover including a metal cladding layer structure and a non-metallic inner layer structure, an outer surface of the metal cover being arranged on the metal cladding layer structure, the metal cladding layer structure enveloping the non-metal inner structure, the metal cover having two cover slots arranged side by side and penetrating therethrough, lengths of the two cover slots being different from each other, and the antenna module comprising:

a substrate disposed on one side of the metal cover, wherein the substrate has a first side surface and a second side surface that is opposite to the first side surface; and an antenna structure being a conductive structure and formed on the first side surface, wherein the antenna structure defines a feeding portion, and the antenna structure includes:

a connecting segment;

a first excitation segment extending from one end of the connecting segment in an extending direction; and a second excitation segment extending from another one end of the connecting segment in the extending direction;

a bottom structure being electrically conductive and disposed on the second side surface, wherein the bottom structure is connected to the antenna structure, and the bottom structure is grounded through the substrate, and wherein the bottom structure has two antenna slots, and lengths of the two antenna slots are different from each other;

wherein, when the antenna module is fixed on the metal cover, a projection region defined by orthogonally projecting the first excitation segment onto the metal cover is at least partially overlapped with one of the two cover slots, a projection region defined by orthogonally projecting the second excitation segment onto the metal cover is at least partially overlapped with another one of the two cover slots, wherein a signal source is fed into the antenna structure through the feeding portion, the antenna structure, one of the two antenna slots, and the one of the two cover slots are configured to generate a first frequency band, the antenna structure, another one of the two antenna slots, and the another one of the two cover slots are configured to generate a second frequency band, and the antenna structure is configured to generate a third frequency band, and wherein a frequency range of the first frequency band, a frequency range of the second frequency band, and a frequency range of the third frequency band are not completely identical to each other.

12. The antenna module according to claim 11, wherein the frequency range of the first frequency band is within a range from 6000 MHz to 7125 MHZ, the frequency range of the second frequency band is with a range from 2310 MHz to 2600 MHZ, and the frequency range of the third frequency band is within a range from 5150 MHz to 5850 MHz.

13. The antenna module according to claim 11, wherein the two cover slots are a short cover slot and a long cover slot, a length of the short cover slot is less than a length of the long cover slot, wherein the two antenna slots are a shore antenna slot and a long antenna slot, the short antenna slot faces toward the short cover slot, and the long antenna slot faces toward the long cover slot, and wherein the length of the short antenna slot is greater than or equal to 80% of the length of the short cover slot, and the length of the long antenna slot is greater than or equal to 80% of the length of the long cover slot.

14. The antenna module according to claim 13, wherein the short cover slot is a rectangular hole, and the length of the short cover slot is within a range from ½ times to 4 times of wavelength corresponding to a center frequency of the first frequency band, wherein the long cover slot is a rectangular hole, and the length of the long cover slot is within a range from ½ times to 4 times of wavelength corresponding to the center frequency of the first frequency band, and wherein each of the short antenna slot and the long antenna slot is a rectangular hole.

15. The antenna module according to claim 13, wherein the metal cover includes a cover intermediate structure arranged between the two cover slots, and the antenna module includes an antenna intermediate structure arranged between the two cover slots, wherein a difference between a length of the cover intermediate structure and a length the antenna intermediate structure is less than 40% of the length of the cover intermediate structure.

16. The antenna module according to claim 11, wherein the two cover slots are a short cover slot and a long cover slot, and a length of the short cover slot is less than a length of the long cover slot, wherein the two antenna slots are a short antenna slot and a long antenna slot, and the short antenna slot faces toward the short cover slot, the long antenna slot faces toward the long cover slot, and wherein a width of the short antenna slot is greater than or equal to 80% of a width of the short cover slot, and a width of the long antenna slot is greater than or equal to 80% of a width of the long cover slot.

17. The antenna module according to claim 11, wherein the antenna module further includes at least one frequency-adjustment structure connected to the bottom structure, wherein the at least one frequency-adjustment structure is formed by extending from an inner side edge of one of the two antenna slots towards an opposite inner side edge of the one of the two antenna slots, or the at least one frequency-adjustment structure is formed by recessing the inner side edge of one of the two antenna slots towards a direction away from the opposite inner side edge of the one of the two antenna slots, and wherein a length of the at least one frequency-adjustment structure is less than a length of the one of the two antenna slots, and a height of the at least one frequency-adjustment structure is less than a height of the one of the two antenna slots.

18. The antenna module according to claim 11, wherein the antenna module further includes a grounding member, and the bottom structure is connected to the grounding member through the substrate, and wherein the grounding member is connected to one of the first excitation segment and the second excitation segment, and the feeding portion is arranged on another one of the first excitation segment and the second excitation segment.

19. The antenna module according to claim 18, wherein the substrate has a plurality of through-holes penetrating therethrough and arranged adjacent to a portion of the grounding member that is connected to the antenna structure, and each of the through-holes is fully filled with one of a plurality of conductive structures, and wherein the grounding member, the antenna structure, and the bottom structure are electrically coupled to each other through the conductive structures in the through-holes.

* * * * *